US009132480B2

(12) United States Patent
Cripps

(10) Patent No.: US 9,132,480 B2
(45) Date of Patent: Sep. 15, 2015

(54) MULTI-COMPONENT POWDER COMPACTION MOLDS AND RELATED METHODS

(75) Inventor: Michael R. Cripps, Murfreesboro, TN (US)

(73) Assignee: KENNAMETAL INC., Latrobe, PA (US)

( * ) Notice: Subject to any disclaimer, the term of this patent is extended or adjusted under 35 U.S.C. 154(b) by 464 days.

(21) Appl. No.: 13/442,135

(22) Filed: Apr. 9, 2012

(65) Prior Publication Data

US 2013/0266681 A1 Oct. 10, 2013

(51) Int. Cl.

*B29C 43/02* (2006.01)
*B22F 3/03* (2006.01)
*B22F 3/12* (2006.01)
*B30B 15/02* (2006.01)

(52) U.S. Cl.

CPC ................. *B22F 3/03* (2013.01); *B22F 3/1208* (2013.01); *B30B 15/022* (2013.01); *Y10T 29/49778* (2015.01)

(58) Field of Classification Search

CPC ................. B22F 3/03; B22F 2003/031; B22F 2005/001; B30B 11/007
USPC ......... 425/78, 330, 352, 441, 348 S, DIG. 58; 100/232; 249/119, 126
See application file for complete search history.

(56) References Cited

U.S. PATENT DOCUMENTS

| | | | | |
|---|---|---|---|---|
| 2,689,539 | A | 9/1954 | Lyon | |
| 3,687,067 | A | 8/1972 | Bettcher | |
| 4,797,085 | A * | 1/1989 | Chiang et al. | 425/78 |
| 5,001,922 | A | 3/1991 | Kranis, Sr. et al. | |
| 6,403,025 | B2 * | 6/2002 | Goransson | 425/78 |
| 6,627,835 | B1 * | 9/2003 | Chung et al. | 700/162 |
| 7,560,068 | B2 * | 7/2009 | Smilovici et al. | 425/78 |
| 7,708,936 | B2 * | 5/2010 | Collin et al. | 419/18 |
| 7,976,250 | B2 | 7/2011 | Fang et al. | |
| 8,033,805 | B2 * | 10/2011 | Gubanich et al. | 425/78 |
| 8,091,655 | B2 * | 1/2012 | Shen et al. | 175/432 |
| 2004/0086415 | A1 | 5/2004 | Gubanich et al. | |
| 2006/0165828 | A1 | 7/2006 | Smilovici et al. | |
| 2009/0136776 | A1 | 5/2009 | Gubanich et al. | |

FOREIGN PATENT DOCUMENTS

| | | | |
|---|---|---|---|
| EP | 0287904 | A2 | 10/1988 |
| GB | 2275054 | A | 8/1994 |
| JP | 2000-42838 | A | 2/2000 |
| JP | 2005-30505 | A | 2/2005 |

OTHER PUBLICATIONS

Jameson, Elman C., Description and Development of Electrical Discharge Machining (EDM), *Electrical Discharge Machining*, Society of Manufacturing Engineers (SME) 2001, 9 pages.
U.S. Appl. No. 13/626,185, filed Sep. 25, 2012.

* cited by examiner

*Primary Examiner* — Joseph S Del Sole
*Assistant Examiner* — Thukhanh T Nguyen
(74) *Attorney, Agent, or Firm* — Matthew Gordon

(57) ABSTRACT

A multi-component powder compaction mold configured for the production of cutting inserts is disclosed. A top section having a cavity wall forming a top cavity and a bottom section having a cavity wall forming a bottom cavity are stacked and aligned so that the top cavity and the bottom cavity collectively form a mold cavity. The mold cavity has a top cavity wall and a bottom cavity wall.

20 Claims, 21 Drawing Sheets

MULTI-COMPONENT POWDER COMPACTION MOLDS AND RELATED METHODS

TECHNICAL FIELD

This disclosure relates to molds for pressing metallurgical powders to form powder compacts for the manufacture of cutting tool inserts.

BACKGROUND

Modular cutting tools are one type of metal and alloy cutting tool that uses indexable cutting inserts that are removably attachable to a tool holder. Metal and alloy cutting inserts generally have a unitary structure and one or more cutting edges located at various corners or around peripheral edges of the inserts. Indexable cutting inserts are mechanically secured to a tool holder, but the inserts are adjustable and removable in relation to the tool holder. Indexable cutting inserts may be readily re-positioned (i.e., indexed) to present a new cutting edge to the workpiece or may be replaced in a tool holder when the cutting edges dull or fracture, for example. In this manner, indexable insert cutting tools are modular cutting tool assemblies that include at least one cutting insert and a tool holder.

Cutting inserts include, for example, milling inserts, turning inserts, drilling inserts, and the like. Cutting inserts may be manufactured from hard materials such as cemented carbides and ceramics. These materials may be processed using powder metallurgy techniques such as blending, pressing, and sintering to produce cutting inserts.

SUMMARY

In a non-limiting embodiment, a multi-component powder compaction mold configured for the production of cutting inserts is disclosed. The multi-component powder compaction mold comprises a top section and a bottom section. The top section comprises a cavity wall forming a top cavity in the top section. The bottom section comprises a cavity wall forming a bottom cavity in the bottom section. The top section and the bottom section are stacked and aligned so that the top cavity and the bottom cavity collectively form a mold cavity comprising a top cavity wall and a bottom cavity wall.

In another non-limiting embodiment, a multi-component powder compaction mold configured for the production of cutting inserts is disclosed. The multi-component powder compaction mold comprises an orthogonal top section, at least one angled middle section, and an orthogonal bottom section. The orthogonal top section comprises an orthogonal cavity wall forming a top cavity in the orthogonal top section. The at least one angled middle section comprises an angled cavity wall forming at least one middle cavity in the angled middle section. The orthogonal bottom section comprises an orthogonal cavity wall forming a bottom cavity in the orthogonal bottom section. The orthogonal top section, the at least one angled middle section, and the orthogonal bottom section are stacked and aligned so that the top cavity, the at least one middle cavity, and the bottom cavity collectively form a mold cavity comprising an orthogonal top cavity wall, at least one angled middle cavity wall, and an orthogonal bottom cavity wall, which form horizontal corner intersections in the mold cavity.

In another non-limiting embodiment, a process for producing a multi-component powder compaction mold is disclosed. A workpiece is cut using a linear material cutting technique to form an orthogonal top section comprising an orthogonal cavity wall forming an orthogonal top cavity in the top section. A workpiece is cut using a linear material cutting technique to form an angled middle section comprising an angled cavity wall forming at least one angled middle cavity in the angled middle section. A workpiece is cut using a linear material cutting technique to form an orthogonal bottom section comprising an orthogonal cavity wall forming an orthogonal bottom cavity in the bottom section. The orthogonal top section, the angled middle section, and the orthogonal bottom section are stacked and aligned so that the top cavity, the at least one middle cavity, and the bottom cavity collectively form a mold cavity comprising an orthogonal top cavity wall, an angled middle cavity wall, and an orthogonal bottom cavity wall, which form horizontal corner intersections in the mold cavity. The orthogonal top section, the angled middle section, and the orthogonal bottom section are joined to form the multi-component powder compaction mold.

It is understood that the invention disclosed and described in this specification is not limited to the embodiments summarized in this Summary.

BRIEF DESCRIPTION OF THE DRAWINGS

Various features and characteristics of the non-limiting and non-exhaustive embodiments disclosed and described in this specification may be better understood by reference to the accompanying figures, in which.

Figure 1A:
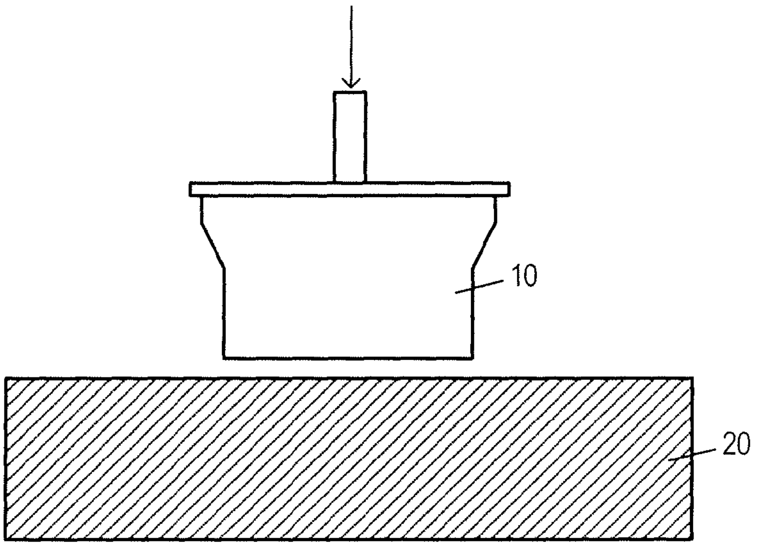
FIGS. 1A through 1F are schematic diagrams illustrating the production of a monolithic powder compaction mold using die sinker electrical discharge machining.
Figure 1B:
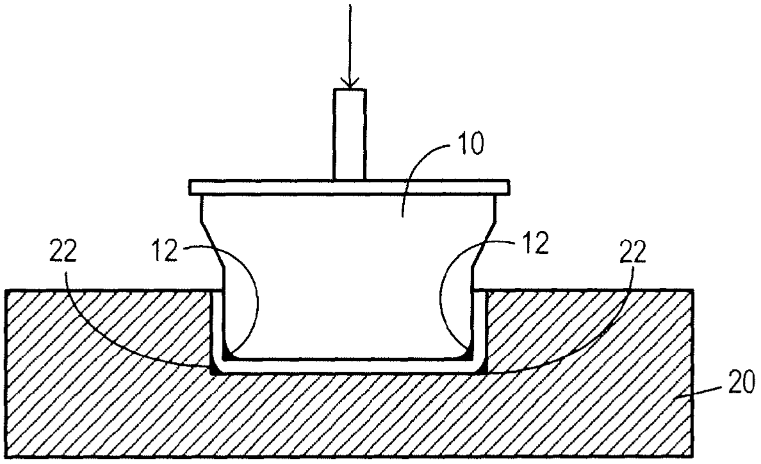

The reader will appreciate the foregoing details, as well as others, upon considering the following detailed description of various non-limiting and non-exhaustive embodiments according to this specification.

DESCRIPTION

Various embodiments are described and illustrated in this specification to provide an overall understanding of the structure, function, operation, manufacture, and use of the disclosed multi-component powder compaction molds. It is understood that the various embodiments described and illustrated in this specification are non-limiting and non-exhaustive. Thus, the invention is not necessarily limited by the description of the various non-limiting and non-exhaustive embodiments disclosed in this specification. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. §112, first paragraph, and 35 U.S.C. §132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicants reserve the right to amend this specification to expressly recite any subject matter, or portion thereof, incorporated by reference herein.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Cutting inserts may be manufactured using powder metallurgy techniques such as blending, pressing, and sintering of powdered metals. For instance, cemented carbide cutting inserts (e.g., comprising tungsten carbide hard particles and cobalt-based binders) may be manufactured by blending metal carbide powder and metal binder powder, pressing the blended metallurgical powders in a mold to form a powder compact in the shape of the cutting insert, and sintering the powder compact to densify the composite material into a cemented carbide cutting insert. In such production processes, the pressing of metallurgical powders into powder compacts may be a near-net-shape operation in which the geometry of the mold cavity and the pressing punches must closely match the final geometry of the cutting insert being produced. Consequently, it is important that powder compaction molds for the production of cutting inserts possess accurate and precise geometries and structural features because any structural or geometric deviations or non-uniformities may be transferred from the mold cavity to the pressed powder compact and the sintered cutting insert.

The manufacture of powder compaction molds for the production of cutting inserts is, therefore, important given the significance of the geometric and structural accuracy and precision of the mold cavities. One method of manufacturing powder compaction molds comprises the use of die sinker electrical discharge machining (EDM), also known as sinker EDM, plunge EDM, or ram EDM.

Electrical discharge machining operates on the principle of spark erosion in which workpiece material is eroded away by an electrical discharge between an electrode and the workpiece. In an EDM operation, a power supply provides an electric current so that a large voltage is applied between the electrode and the workpiece, which are held at opposite polarity. The electrode and the workpiece are brought into close proximity, but separated by a small gap that is filled with a dielectric fluid. The dielectric fluid functions as an insulating material, which permits the accumulation of electrical charge of opposite polarity on the surfaces of the electrode and the workpiece, respectively. When a sufficient voltage develops between the electrode and the workpiece, the dielectric fluid breaks down and ionizes, thereby forming a plasma channel through the gap between the electrode and the workpiece. The accumulated electrical charge rapidly discharges through the ionized plasma channel, forming a spark between the electrode and the workpiece, and generating substantial heat, which melts and vaporizes the material comprising the workpiece. In this manner, spark erosion is used to machine the workpiece while maintaining the gap between the electrode and the workpiece, which is required to prevent short circuiting. Electrical discharge machining is described in greater detail in Elman C. Jameson, *Electrical Discharge Machining*, Society of Manufacturing Engineers (SME), 2001, which is incorporated by reference into this specification.

EDM techniques include die sinker EDM, wire EDM (also known as wire-cut EDM and wire cutting), and small hole EDM drilling. Die sinker EDM involves the use of a pre-shaped electrode to form a blind cavity or a through cavity in a workpiece. The die sinker EDM electrode is pre-shaped to have geometry and dimensions corresponding to the shape of the cavity to be machined into the workpiece. In operation, a computer numerical control (CNC) system advances the die sinker electrode into the workpiece, maintaining the required gap, and cycling the electrical power in accordance with a duty cycle. The cycled electrical power produces the sparks along the surfaces of the formed electrode during the on-time of the duty cycle, which correspondingly erodes the surfaces of the workpiece, thereby transferring the geometry of the electrode into the workpiece. Circulating dielectric fluid flushes the eroded material from the gap between the electrode and the workpiece during the off-time of the duty cycle.

The electrode and the workpiece in EDM must both be electrically conductive in order to establish the necessary voltage to cause dielectric breakdown, ionization, sparking, and erosion. Workpieces comprising any electrically conductive metal, alloy, cemented carbide, or other material may be machined using EDM. Die-sinker EDM electrodes are generally made from graphite, tungsten, copper-tungsten, or tungsten carbide. Regardless of the material of construction, all EDM electrodes exhibit considerable erosion during EDM operations. The largest amount of electrode erosion occurs at corner intersections on the electrode surfaces because the spark density is greater due to the larger workpiece area in proximity to the corner intersections. The erosion of die-sinker EDM electrodes changes the geometry of the electrodes, which in turn, causes deviations and non-uniformities in the geometry transferred into the cavity machined in the workpiece.

The erosion of die sinker EDM electrodes may be particularly problematic in the manufacture of powder compaction molds for producing cutting inserts because structural or geometric deviations and non-uniformities transferred from an eroded electrode to the mold cavity are, in turn, transferred from the mold cavity to the pressed powder compact and the sintered cutting insert. Structural or geometric deviations in the mold cavity may also prevent the action of pressing punches from effectively entering a mold cavity and compacting the metallurgical powders. This may be particularly problematic because the pressing of metallurgical powders into powder compacts may be a near-net-shape operation in which the geometry of the mold cavity and the die punches must closely match the final geometry of the cutting insert being produced.

By way of example, FIGS. 1A through 1E illustrate the production of a monolithic powder compaction mold using die sinker EDM. As used herein, the term "monolithic" refers to being made or formed from a single piece of material, as opposed to being assembled from multiple discrete components. A die sinker EDM electrode 10 comprises the geometry of a mold cavity to be formed in a workpiece 20 to produce a monolithic powder compaction mold for producing cutting inserts. As the die sinker EDM electrode 10 advances into the workpiece 20, spark erosion between the surfaces of the electrode 10 and the surface of the workpiece 20 machines the workpiece and transfers the geometry of the electrode 10 into the workpiece 20. The die sinker EDM electrode 10 also erodes during the spark erosion, particularly at the horizontal corner intersections 12 of the electrode 10, wherein the corners are rounded, thereby producing rounded horizontal corner intersections 22 in the workpiece 20.

Figure 1C:
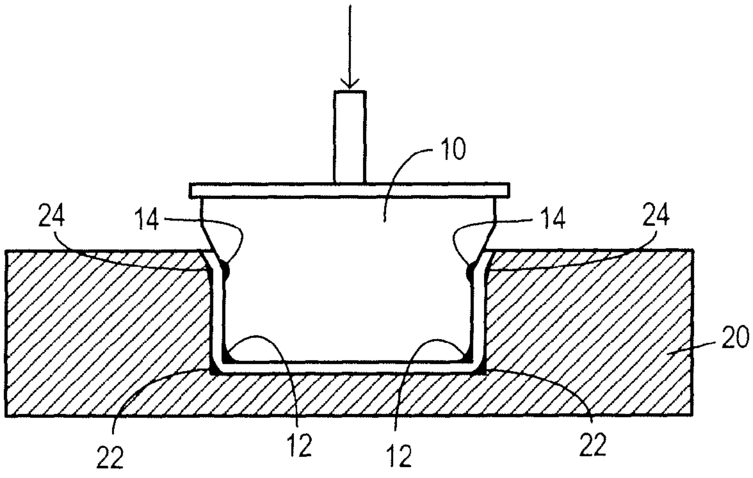
Figure 1D:
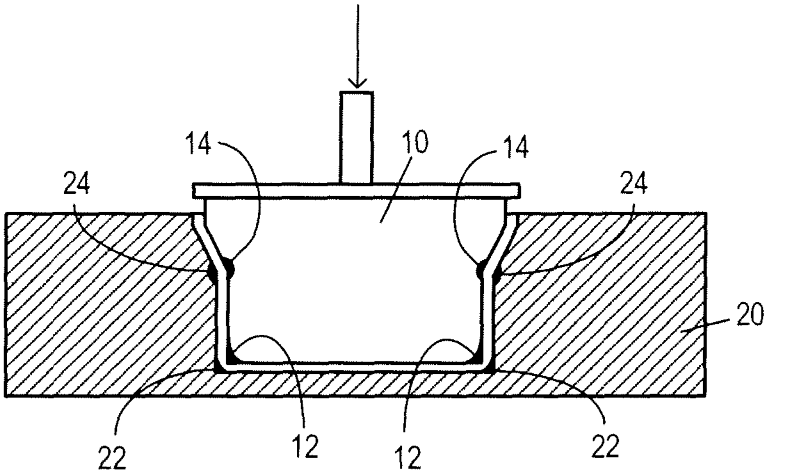
Figure 1E:
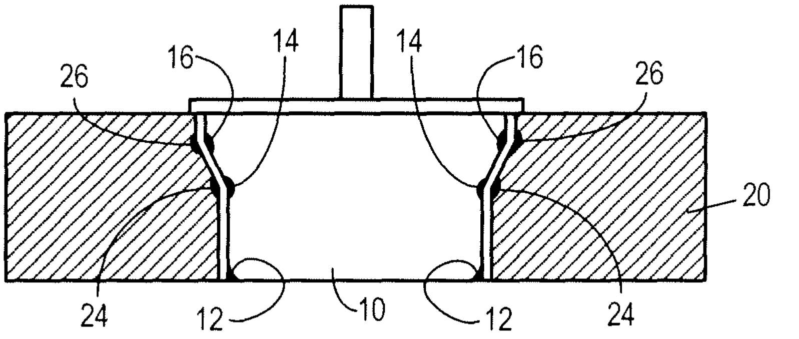

Referring to FIGS. 1C and 1D, as the die sinker EDM electrode 10 advances further into the workpiece 20 to produce a correspondingly-shaped mold cavity, the electrode 10 continues to erode at horizontal corner intersections 12 (producing rounded horizontal corner intersections 22), and also erodes at horizontal corner intersections 14 (producing rounded horizontal corners 14), which are transferred through the spark erosion process to the workpiece, thereby forming rounded horizontal corner intersections 24. Referring to FIG. 1E, when the electrode 10 is fully advanced into the workpiece 20, the erosion at the corner intersections 14 and 16 of the electrode 10 has produced rounded horizontal corner intersections 24 and 26 in the workpiece 20.

Figure 1F:
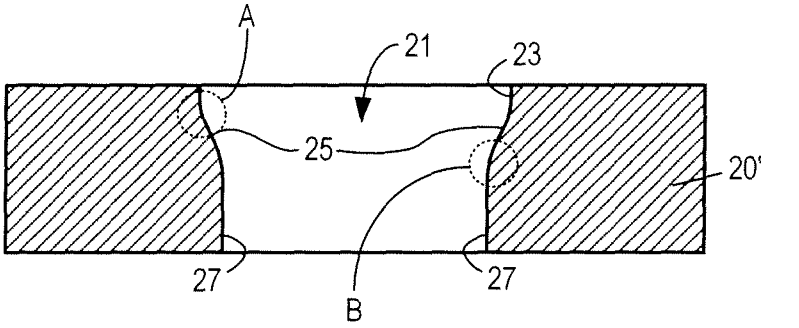
Figure 2A:
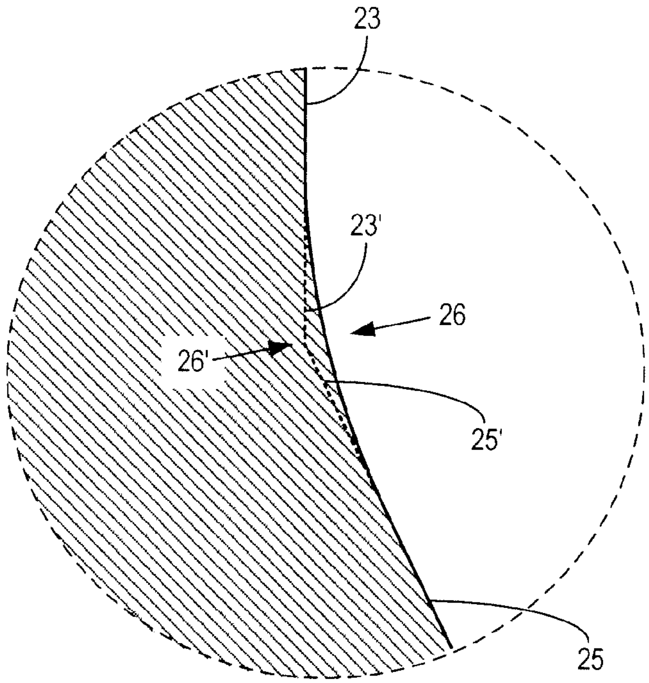
FIGS. 2A and 2B are magnified views of the rounded corner intersections of the monolithic powder compaction mold shown in FIG. 1F.
Figure 2B:
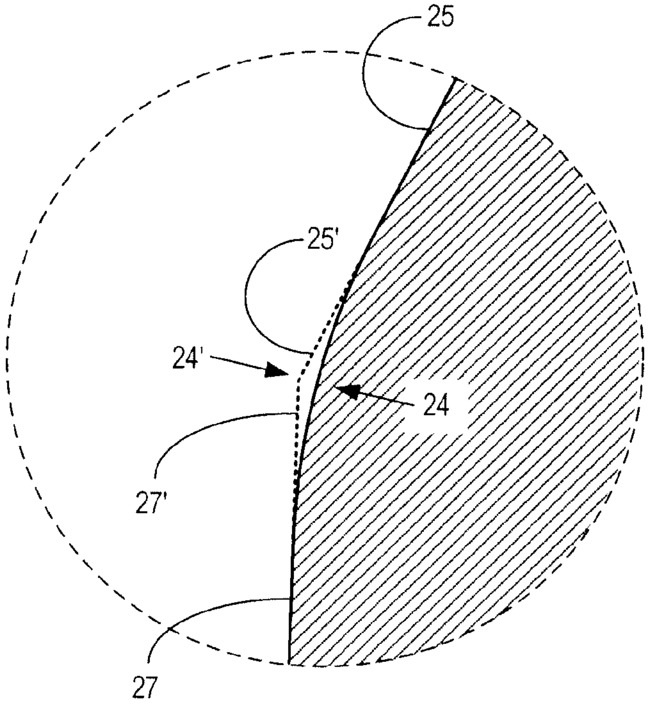

FIG. 1F shows a monolithic powder compaction mold 20' produced using die sinker EDM as shown in FIGS. 1A through 1E. The monolithic powder compaction mold 20' comprises a mold cavity 21 comprising an upper cavity wall 23, a middle cavity wall 25, and a lower cavity wall 27. The cavity walls 23 and 27 would allow for entry of pressing punches into the mold 20', and the cavity wall 25 would form the peripheral surfaces of a cutting insert sintered from a powder compact pressed in the mold 20'. The upper cavity wall 23 is separated from the middle cavity wall 25 by the rounded horizontal corner 26, as illustrated in FIG. 2A, which shows a magnified view of the rounded horizontal corner indicated by circle A in FIG. 1F. The lower cavity wall 27 is separated from the middle cavity wall 25 by the rounded horizontal corner 26, as illustrated in FIG. 2B, which shows a magnified view of the rounded horizontal corner indicated by circle B in FIG. 1F.

The corner erosion of the die sinker EDM electrode 10 used to form the mold cavity 21 produced the rounded horizontal corners 24 and 26. Referring to FIG. 2A, absent the corner erosion of the electrode, the die cavity 21 would comprise sharp horizontal corners 26' formed at the intersection of the upper cavity wall 23' and the middle cavity wall 25'. Referring to FIG. 2B, absent the corner erosion of the electrode, the die cavity 21 would comprise sharp horizontal corners 24' formed at the intersection of the lower cavity wall 27' and the middle cavity wall 25'.

FIGS. 3A through 3D illustrate the production of a monolithic powder compaction mold using a modified die sinker EDM process. A die sinker EDM electrode 30 comprises, in part, the geometry of a mold cavity to be formed in a workpiece 40 to produce a monolithic powder compaction mold for producing cutting inserts. The workpiece 40 comprises a preform cavity 41 that spans the thickness of the workpiece. The preform cavity 41 comprises the peripheral shape of the mold cavity to be formed in the workpiece 40 and may be pre-cut into the workpiece using a linear material cutting technique such as wire EDM, laser cutting, or water jet cutting, for example.

Figure 3A:
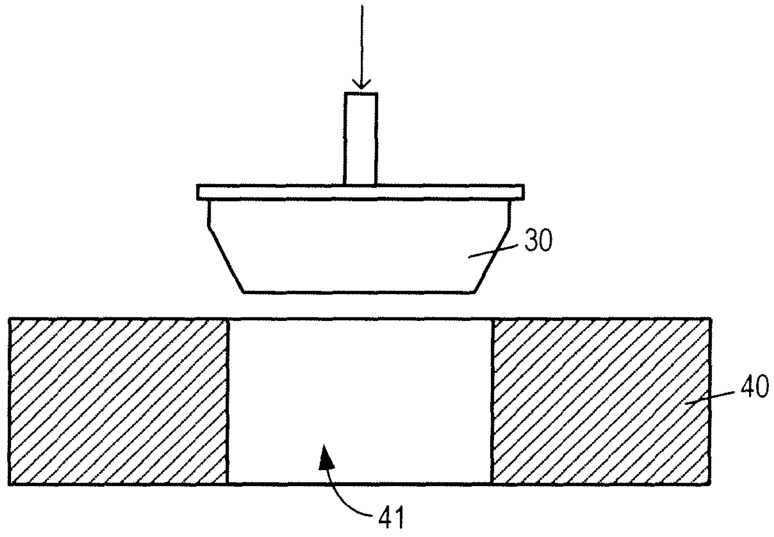
FIGS. 3A through 3E are schematic diagrams illustrating the production of a monolithic powder compaction mold using die sinker electrical discharge machining.
Figure 3B:
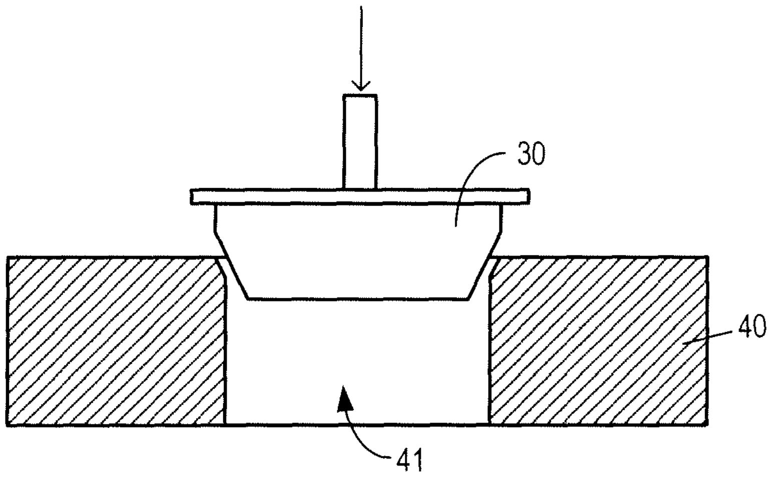
Figure 3C:
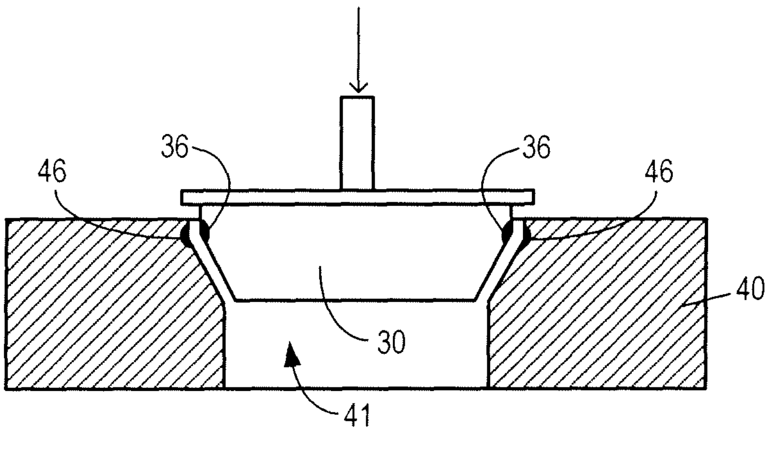
Figure 3D:
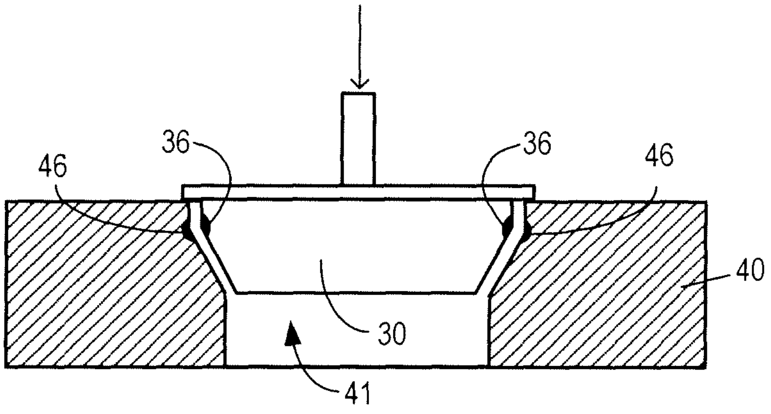

The die sinker EDM electrode 30 is centered at the preform cavity 41. As the die sinker EDM electrode 30 advances into the workpiece 40, spark erosion between the surfaces of the electrode 30 and the surface of the workpiece 40 machines the workpiece and transfers the geometry of the electrode 30 into the workpiece 40. The die sinker EDM electrode 30 also erodes during the spark erosion, particularly at the horizontal corner intersections 36 of the electrode 30, wherein the corners are rounded, thereby producing rounded horizontal corner intersections 46 in the workpiece 40. Referring to FIG. 3D, when the electrode 30 is fully advanced into the workpiece 40, the erosion at the corner intersections 36 of the electrode 30 has produced rounded horizontal corner intersections 46 in the workpiece 40.

Figure 3E:
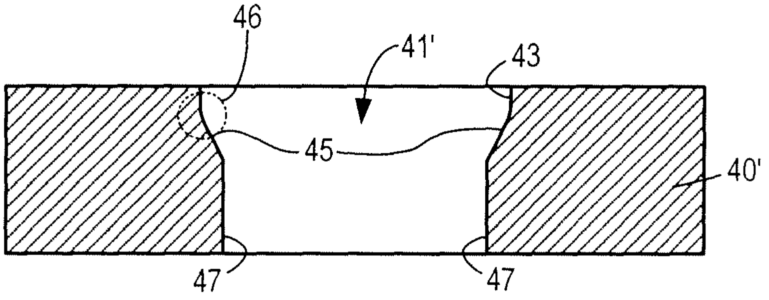
Figure 4A:
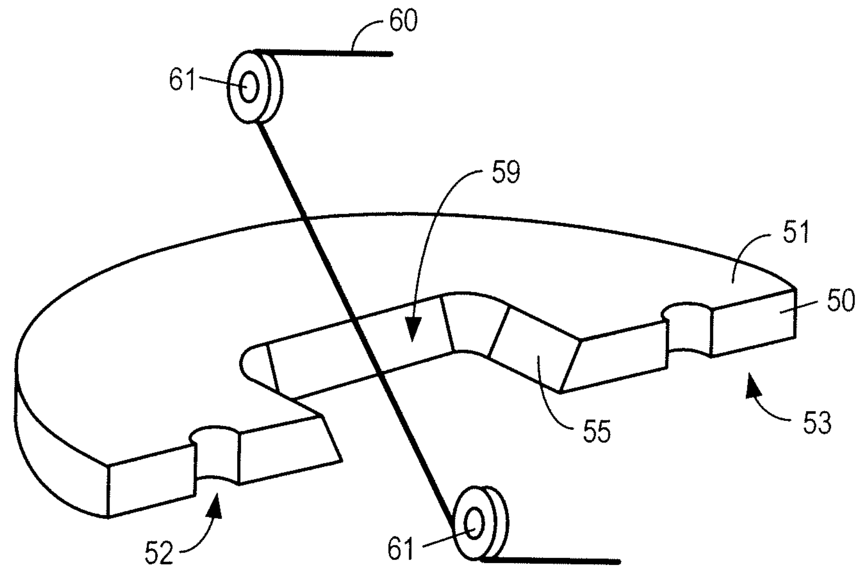
FIGS. 4A through 4D are schematic diagrams illustrating the production of an angled middle section of a multi-component powder compaction mold using wire electrical discharge machining.
Figure 4B:
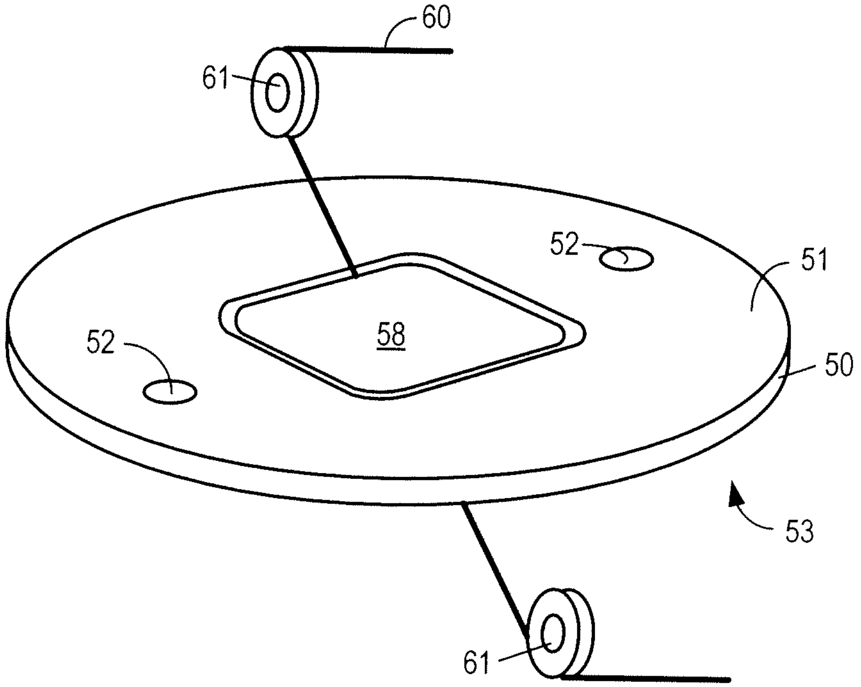
Figure 4C:
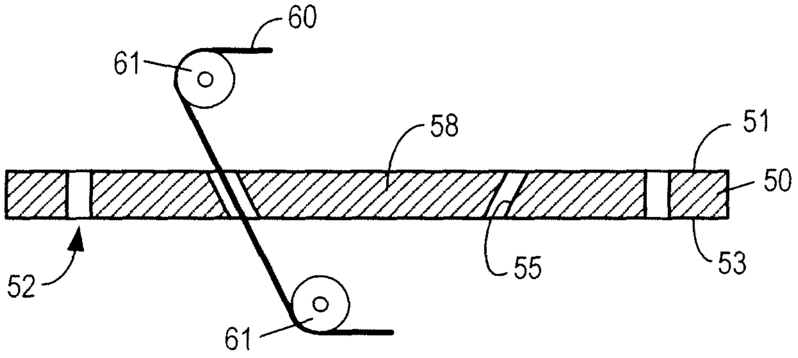
Figure 4D:
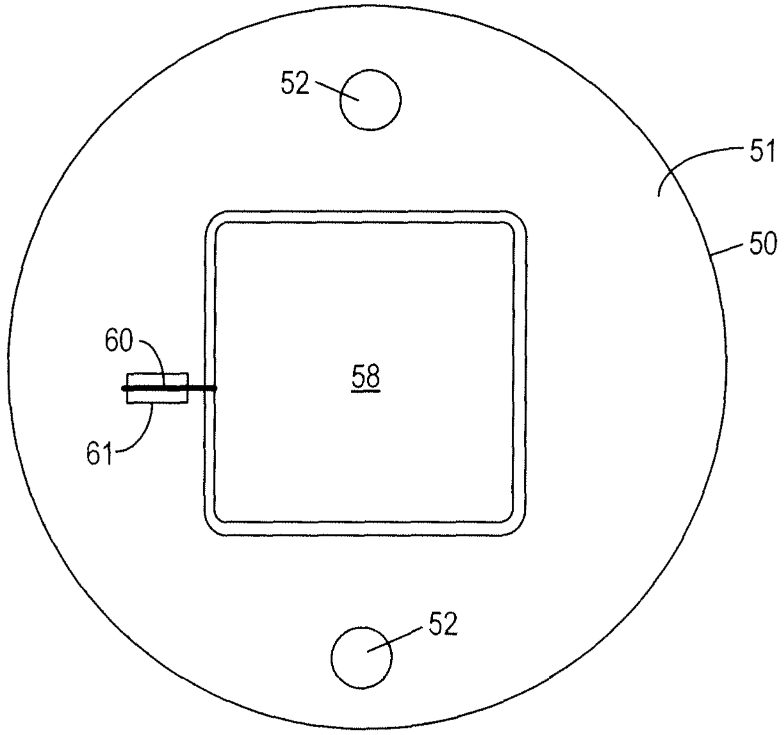

FIG. 3E shows a monolithic powder compaction mold 40' produced using die sinker EDM as shown in FIGS. 3A through 3D. The monolithic powder compaction mold 40' comprises a mold cavity 41' comprising an upper cavity wall 43, a middle cavity wall 45, and a lower cavity wall 47. The cavity walls 43 and 47 would allow for entry of pressing punches into the mold 40', and the cavity wall 45 would form the peripheral surfaces of a cutting insert sintered from a powder compact pressed in the mold 40'. The upper cavity wall 43 is separated from the middle cavity wall 45 by the rounded horizontal corner 46. The rounded horizontal corner 46 is similar to the rounded horizontal corner 26 shown in detail in FIG. 2A. The corner erosion of the die sinker EDM electrode 30 used to form the mold cavity 41' produced the rounded horizontal corners 46.

The rounded horizontal corners in the mold cavity of a monolithic powder compaction mold produced using die sinker EDM may limit the use of the mold in the production of pressed-and-sintered cutting inserts because the rounded corners may prevent pressing punches from effectively entering the mold to the necessary position to achieve efficient compaction of metallurgical powders. Furthermore, because the production of the mold is a two-step procedure comprising: (1) shaping the die sinker EDM electrode; and (2) conducting EDM with the electrode; any errors in the electrode production (e.g., deviations or non-uniformities in the structure, geometry, or dimensions of the electrode) will be transferred into the mold cavity, which may compound any errors due to the inherent erosion of the electrode itself.

To address these problems, the present inventor tested different materials of construction for die sinker EDM electrodes and different materials of construction for powder compaction molds. In addition, various EDM parameters, such as, for example, applied voltage and duty cycle, were evaluated during the production of powder compaction molds using die sinker EDM. The use of multiple die sinker EDM electrodes for roughing, semi-finishing, and finishing mold cavities to final dimensions and geometry was also investigated. The use of various materials of construction, multiple electrodes, and optimized EDM parameters, however, did not sufficiently reduce or eliminate deviations in the shape of the cavities in monolithic powder compaction molds produced using die sinker EDM.

Various non-limiting embodiments described in this specification address the problems associated with monolithic powder compaction molds produced using die sinker EDM by providing a multi-component powder compaction mold comprising multiple sections, which when assembled together, form mold cavities having sharp horizontal corner intersections and lacking the corner rounding, non-uniformities, and shape deviations inherent in monolithic powder compaction molds produced using die sinker EDM. In various non-limiting embodiments, each section of a multi-component powder compaction mold may be individually produced using a linear material cutting technique such as wire EDM, laser cutting, or water jet cutting, for example.

Like die sinker EDM, wire EDM operations machine electrically conductive materials, such as, for example; metals, alloys, and cemented carbides, using spark erosion between an electrode and a workpiece. However, rather than a pre-shaped die sinker EDM electrode that advances into a workpiece, wire EDM uses a wire electrode that is continuously and linearly fed through a workpiece thickness, and which moves laterally through the workpiece width and length dimensions to cut the material comprising the workpiece. In operation, a computer numerical control (CNC) system continuously feeds the wire electrode through the workpiece thickness and translates the wire electrode laterally through the workpiece width and length dimensions, maintaining the required electrode-workpiece gap, and cycling the electrical power in accordance with a duty cycle. The cycled electrical power produces the sparks between the wire electrode and the workpiece material surrounding the wire electrode during the on-time of the duty cycle, which correspondingly erodes the workpiece material, thereby cutting the workpiece in the lateral width and length dimensions in accordance with the controlled lateral movement of the wire electrode. Dielectric fluid flushes the eroded material from the gap between the wire electrode and the workpiece during the off-time of the duty cycle.

Wire EDM may be considered a linear material cutting technique in the sense that the wire produces a linear cut through the thickness of the workpiece. However, it is understood that wire EDM is not limited to linear cuts through the lateral dimensions (i.e., the width and length) of the workpiece, and wire EDM may be used to produce arcuate cuts, linear cuts, and combinations thereof in the lateral dimensions. Likewise, laser cutting and water jet cutting are considered linear material cutting techniques because the laser beam and the water jet used to cut a workpiece produce a linear cut through the thickness dimension of the workpiece, but may produce arcuate cuts, linear cuts, and combinations thereof in the lateral dimensions.

The wire electrode in wire EDM operations also erodes due to the spark erosion process. However, unlike die sinker EDM operations, in wire EDM operations, new wire electrode is continuously fed through the workpiece and, therefore, any defects or non-uniformities in the wire electrode due to the spark erosion process are not transferred to the workpiece. Consequently, multi-component powder compaction molds produced using wire EDM operations do not exhibit the horizontal corner rounding, non-uniformities, and shape deviations inherent in monolithic powder compaction molds produced using die sinker EDM.

FIGS. 4A-4D show the production of a middle section 50 of a multi-component powder compaction mold using wire EDM. The middle section 50 comprises a top surface 51 and a bottom surface 53. A wire electrode 60 is continuously and linearly fed through the thickness of the workpiece and translated in a combination of linear and arcuate lateral paths through the lateral dimensions of the workpiece (i.e., along the top surface 51 and the bottom surface 53) to cut out portion 58 and form angled cavity wall 55. The wire electrode 60 is fed through the workpiece 50 by pulley wheels 61. In this manner, the wire EDM operation cuts a generally square-shaped cavity 59 through the thickness of the workpiece, thereby producing the middle section 50 of a multi-component powder compaction mold. The middle section 50 of a multi-component powder compaction mold comprises alignment holes 52, which may be cut out using wire EDM or any other suitable machining operation, and which may function to ensure alignment of the middle section 50 with top and bottom sections, not shown.

Figure 5A:
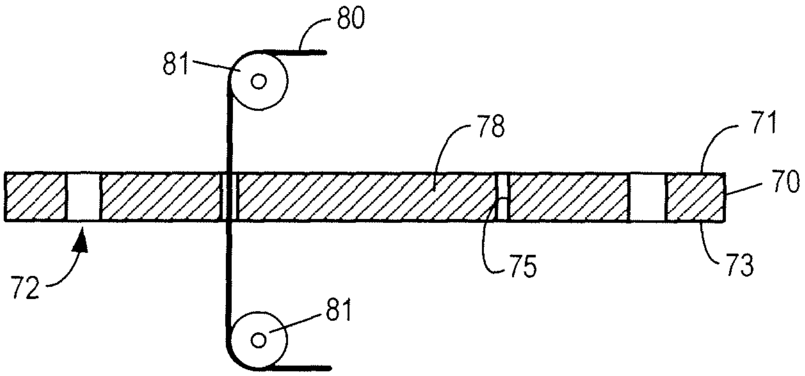
FIGS. 5A and 5B are schematic diagrams illustrating the production of an orthogonal top section of a multi-component powder compaction mold using wire electrical discharge machining.
Figure 5B:
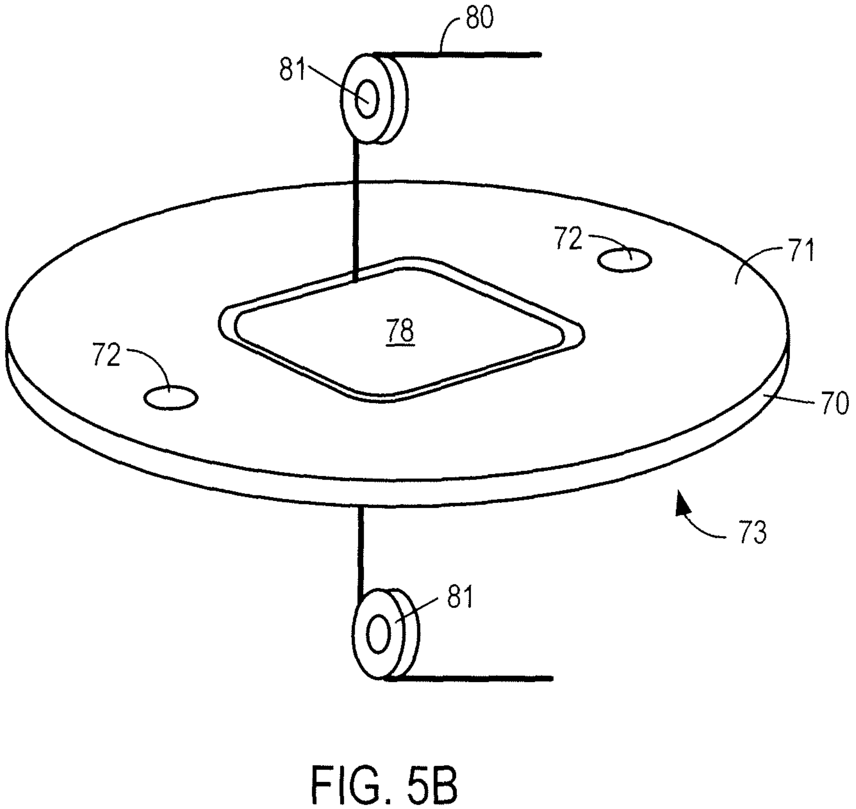

FIGS. 5A and 5B show the production of a top or bottom section 70 of a multi-component powder compaction mold using wire EDM. The top or bottom section 70 comprises a top surface 71 and a bottom surface 73. A wire electrode 80 is continuously and linearly fed through the thickness of the workpiece and translated in a combination of linear and arcuate lateral paths through the lateral dimensions of the workpiece (i.e., along the top surface 71 and the bottom surface 73) to cut out portion 78 and form orthogonal cavity wall 75. The wire electrode 80 is fed through the workpiece 70 by pulley wheels 81. In this manner, the wire EDM operation cuts a generally square-shaped cavity (located in the space occupied by the cut-out portion 78) through the thickness of the workpiece, thereby producing the top or bottom section 70 of a multi-component powder compaction mold. The top or bottom section 70 of a multi-component powder compaction mold comprises alignment holes 72, which may be cut out using wire EDM or any other suitable machining operation, and which may function to ensure alignment of the top or bottom section 70 with a middle section.

Figure 6A:
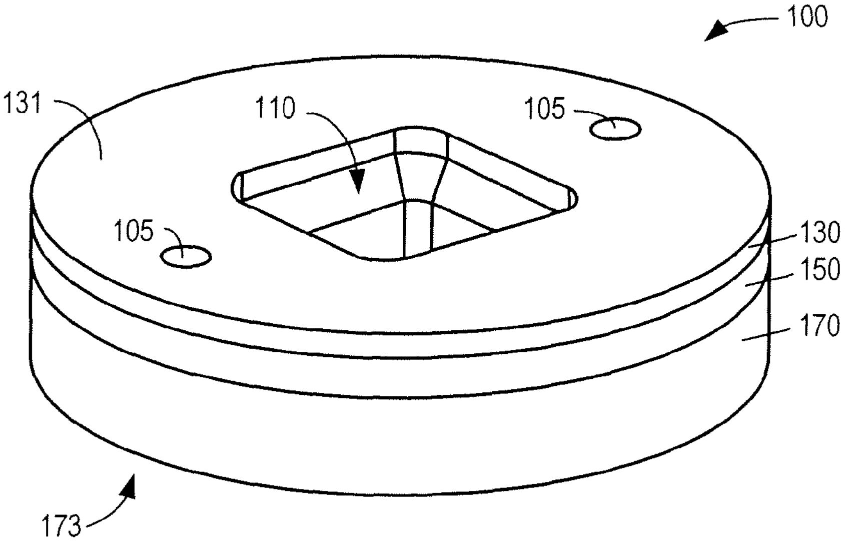
FIG. 6A is a perspective view of a multi-component powder compaction mold comprising an orthogonal top section, an angled middle section, and an orthogonal bottom section, wherein the mold cavity comprises a generally square peripheral shape.
Figure 6B:
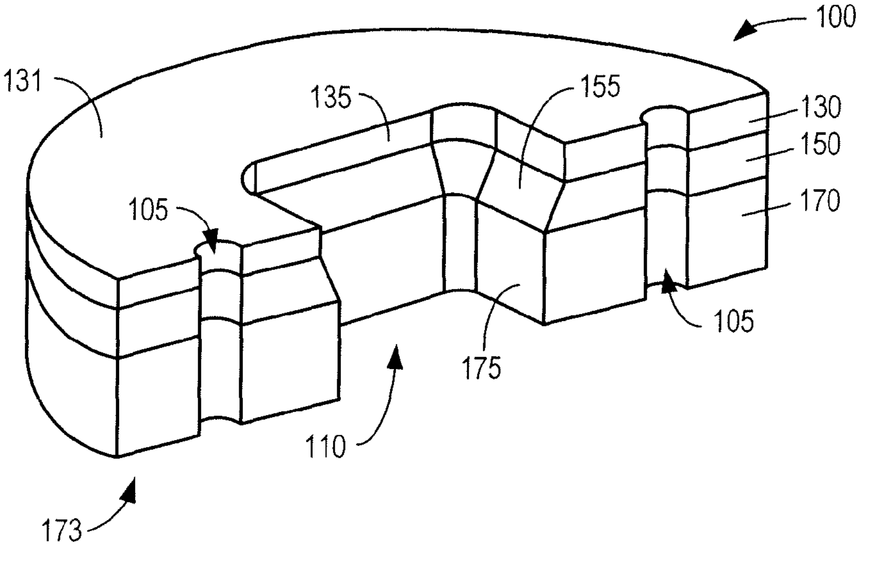
FIG. 6B is a cross-sectional perspective view of the multi-component powder compaction mold shown in FIG. 6A.
Figure 6C:
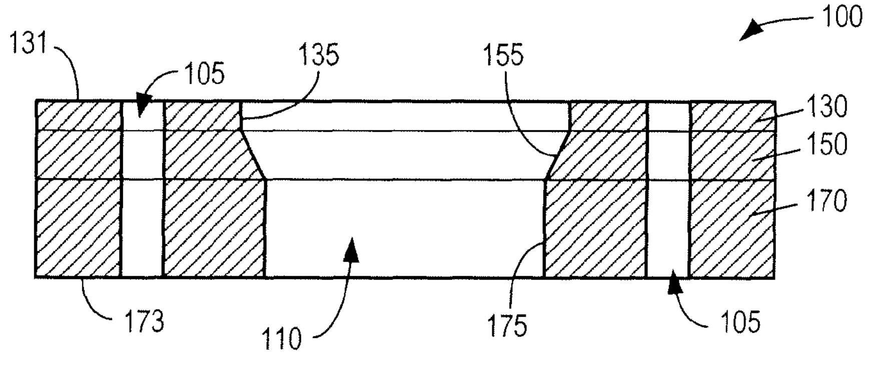
FIG. 6C is a side cross-sectional view of the multi-component powder compaction mold shown in FIGS. 6A and 6B.

FIGS. 6A through 6C show a multi-component powder compaction mold 100 comprising a top section 130, a middle section 150, and a bottom section 170. The mold 100 comprises a mold cavity 110 formed from the respective cavities 110*a*, 110*b*, and 110*c* of the top section 130, the middle section 150, and the bottom section 170 (see FIGS. 7 and 8). When assembled together, the cavity 110*a* of the top section 130, the cavity 110*b* of the middle section 150, and the cavity 110*c* of the bottom section 170 form the mold cavity 110 of the mold 100. The mold cavity 110 has sharp horizontal corner intersections between the orthogonal cavity wall 135 (of the top section 130) and the angled cavity wall 155 (of the middle section 150). The mold cavity 110 also has sharp horizontal corner intersections between the angled cavity wall 155 (of the middle section 150) and the orthogonal cavity wall 175 (of the bottom section 170). The mold 100 lacks the horizontal corner rounding, non-uniformities, and shape deviations inherent in monolithic powder compaction molds produced using die sinker EDM, for example.

Figure 6D:
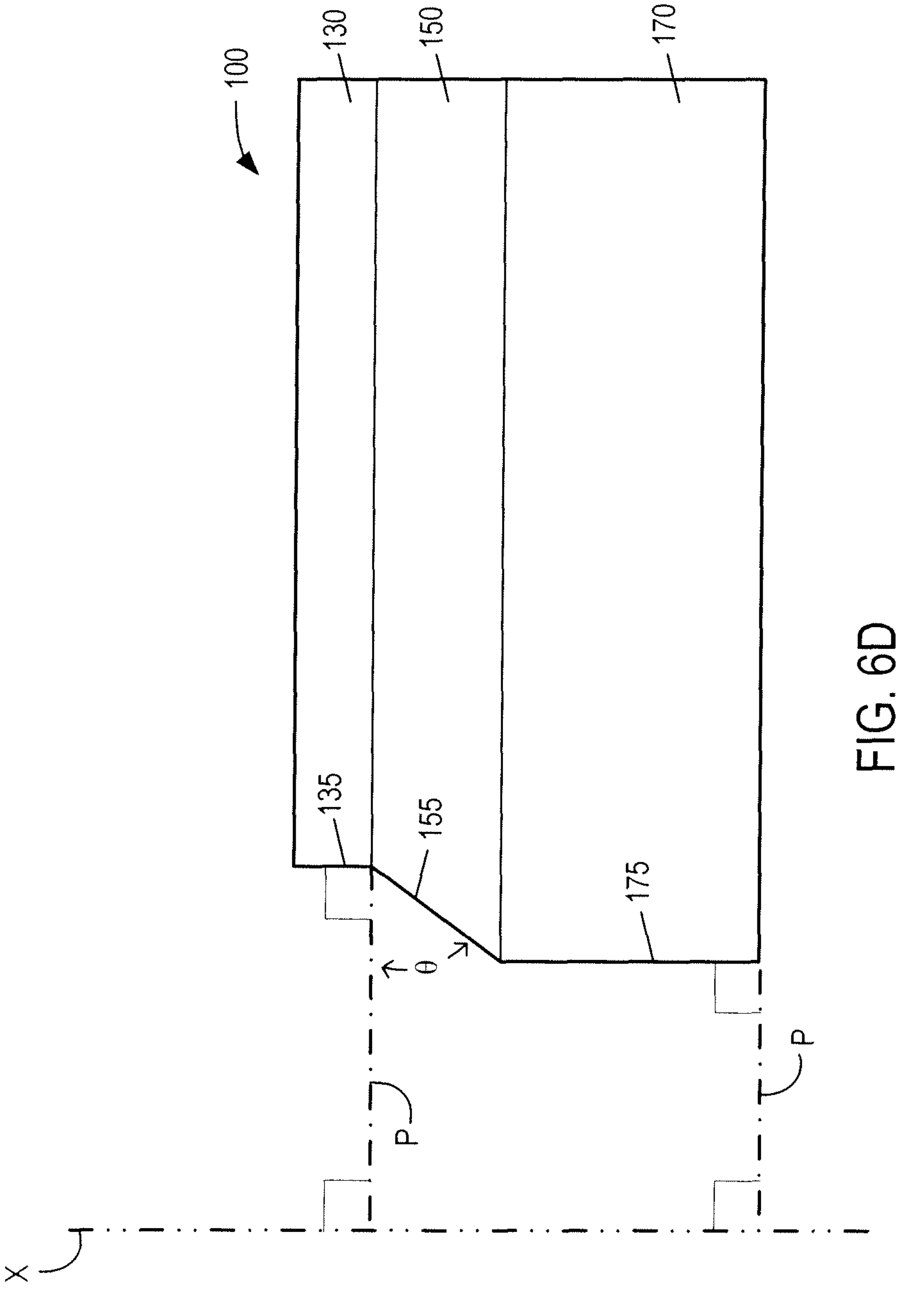
FIG. 6D is a schematic diagram illustrating the orientation of the multi-component powder compaction mold shown in FIGS. 6A through 6C relative to the pressing axis and pressing plane of the mold.

The use of the term "orthogonal" and "angled" with respect to the cavity wall of a section refers to the orientation of the cavity wall relative to the pressing plane of the mold. In turn, the "pressing plane" is a plane perpendicular to the pressing axis of the mold. For example, referring to FIG. 6D, top section 130 and bottom section 170 comprise cavity walls 135 and 175, respectively, which are generally perpendicular (i.e., orthogonal) to the pressing plane (P) of the mold 100. The middle section 150 comprises cavity wall 155, which forms a generally non-perpendicular angle (θ) with respect to the pressing plane (P) of the mold 100. The pressing plane (P) is perpendicular to the pressing axis (X), which is defined as the direction in which pressing punches (not shown) travel when entering the multi-component powder compaction mold 100 and compressing a metallurgical powder into a powder compact (not shown). In this manner, the top section 130 and the bottom section 170 may be referred to as orthogonal sections, and the middle section 150 may be referred to as an angled section. Likewise, the top cavity 110*a* and the bottom cavity 110*c* may be referred to as orthogonal cavities, and the middle cavity 110*b* may be referred to as an angled cavity.

The pressing plane is a plane that is perpendicular to the pressing axis and that passes through the section of a multi-component powder compaction mold being specified. An orthogonal cavity wall (of an orthogonal cavity/orthogonal section) will be perpendicular to the pressing plane and parallel to the pressing axis. An angled cavity wall (of an angled cavity/angled section) will form a generally non-perpendicular angle with respect to the pressing plane and will form a complementary angle with respect to the pressing axis (i.e., the angles sum to 90°).

In various non-limiting embodiments, a multi-component powder compaction mold may comprise sections having top and/or bottom surfaces that are generally parallel to the pressing plane of the mold (and generally perpendicular to the pressing axis of the mold). For example, referring to FIGS. 7 and 8, top section 130 and bottom section 170 comprise cavity walls 135 and 175, respectively, which are generally perpendicular to the top surfaces (131 and 171) and the bottom surfaces (133 and 173) of the top section 130 and the bottom section 170. The middle section 150 comprises cavity wall 155, which forms a generally non-perpendicular angle with respect to the top surface 151 and the bottom surface 153 of the middle section 150.

In various non-limiting embodiments, a multi-component powder compaction mold may comprise sections having top and/or bottom surfaces that are not parallel to the pressing plane of the mold (and not perpendicular to the pressing axis of the mold). For example, a multi-component powder compaction mold may comprise sections having contoured top and/or contoured bottom surfaces (see FIGS. 10A and 10B); and, in other non-limiting embodiments, a multi-component powder compaction mold may comprise sections having planar top and/or bottom surfaces, wherein the planar surfaces form constant or varying angles with respect to the pressing plane and/or the pressing axis of the mold. In such embodiments, the various sections may still be referred to as "orthogonal" sections or "angled" sections depending upon whether the cavity walls of the sections are generally perpendicular (i.e., orthogonal) to the pressing plane of the mold 100 or form a generally non-perpendicular angle with respect to the pressing plane of the mold.

Referring to FIGS. 6A through 8, the top section 130, the middle section 150, and the bottom section 170 may be produced using a linear material cutting technique such as wire EDM, laser cutting, or water jet cutting, for example, to cut out the cavities 110*a*, 110*b*, and 110*c*, respectively. Likewise, a linear material cutting technique such as wire EDM, laser cutting, or water jet cutting, or any other suitable machining technique, may be used to cut out alignment holes 105*a*, 105*b*, and 105*c* in the top section 130, the middle section 150, and the bottom section 170, respectively. Referring to FIGS.

7 and 8, the respective alignment holes 105*a*, 105*b*, and 105*c* are configured to align the respective sections so that the respective cavity walls 135, 155, and 175 intersect to form sharp horizontal corners that do not exhibit problematic corner rounding or other problematic non-uniformities (see FIG. 6C). The bottom surface 133 of the top section 130 is configured to mate with the top surface 151 of the middle section 150 when in an assembled (i.e., stacked and aligned) configuration (as shown in FIGS. 6A through 6C). Likewise, bottom surface 153 of the middle section 150 is configured to mate with the top surface 171 of the bottom section 170 when in an assembled configuration.

Figure 7:
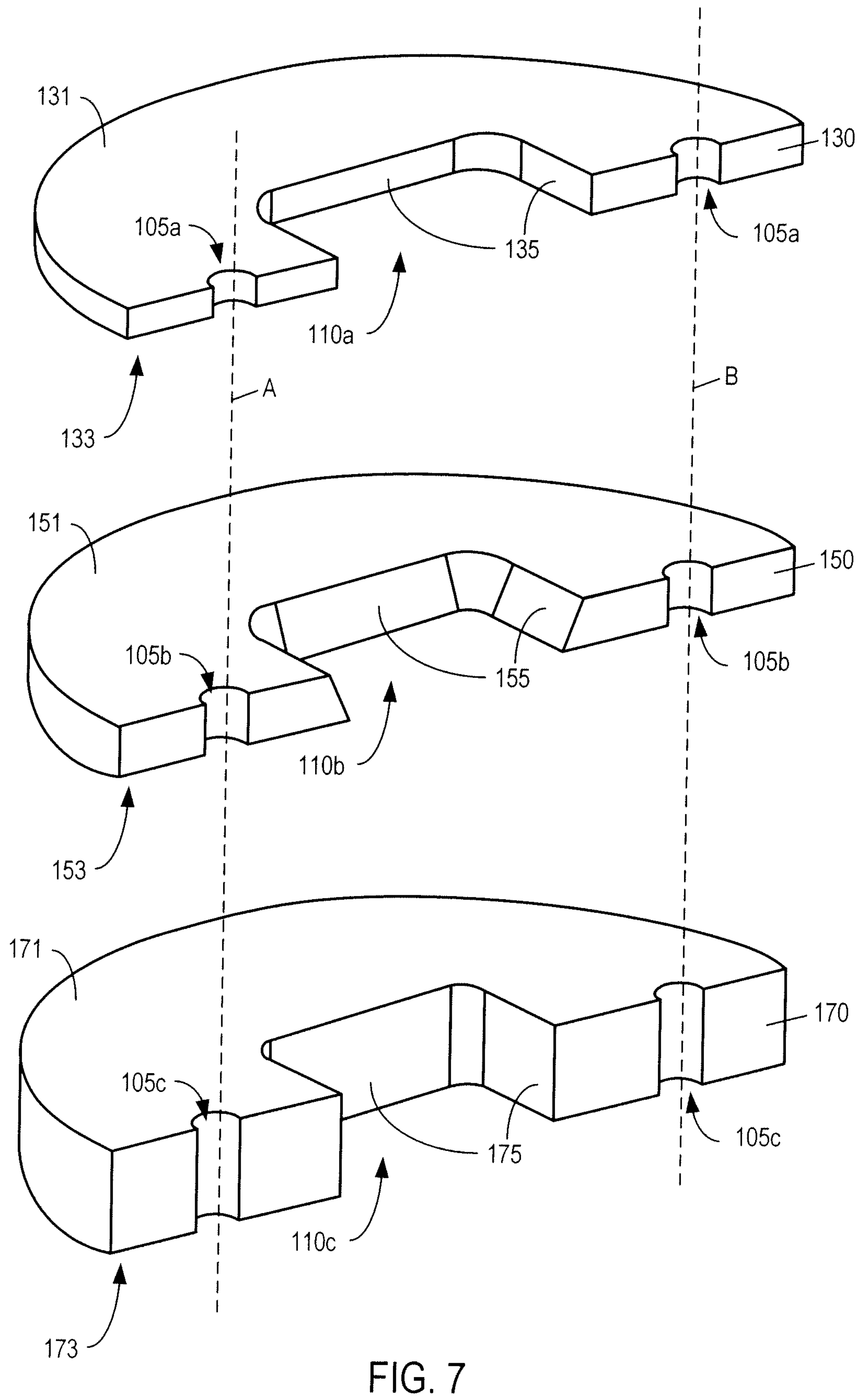
FIG. 7 is an expanded perspective view of the multi-component powder compaction mold shown in FIGS. 6A, 6B, and 6C.
Figure 8:
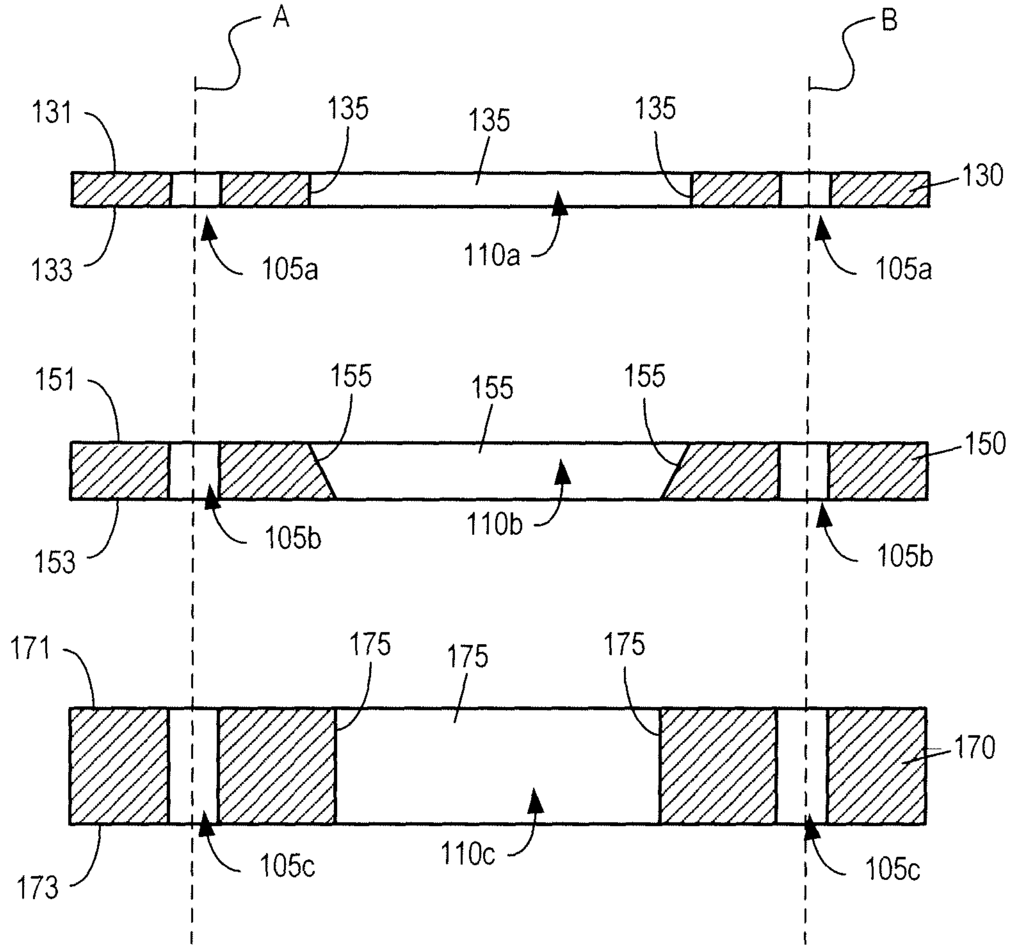
FIG. 8 is an expanded side cross-sectional view of the multi-component powder compaction mold shown in FIGS. 6A, 6B, and 6C, and 7.

When in an assembled configuration (i.e., stacked and aligned as shown in FIGS. 6A through 6C), the alignment holes 105 (comprising respective alignment holes 105*a*, 105*b*, and 105*c* aligned along lines A and B as shown in FIGS. 7 and 8) proceed from the top surface 131 of the top section 130 through the mold (including all of the stacked section) to the bottom surface 173 of the bottom section 170.

Multi-component powder compaction molds in accordance with various non-limiting embodiments may comprise mold cavities having any peripheral shape formed by the cavity walls of the plurality of mold sections comprising the mold. For example, FIGS. 6A through 6C, 7, and 7 show a non-limiting embodiment comprising a generally square-shaped mold cavity that produces generally square-shaped metallurgical powder compacts, which may be sintered to produce generally square-shaped cutting inserts. The use of the term "generally" with respect to the peripheral shape of a mold cavity indicates that the shape may deviate from the specified geometrical shape by comprising vertical fillets transitioning between intersecting surfaces (as shown in FIGS. 6A, 6B, and 7) instead of vertical apex intersections.

Figure 9A:
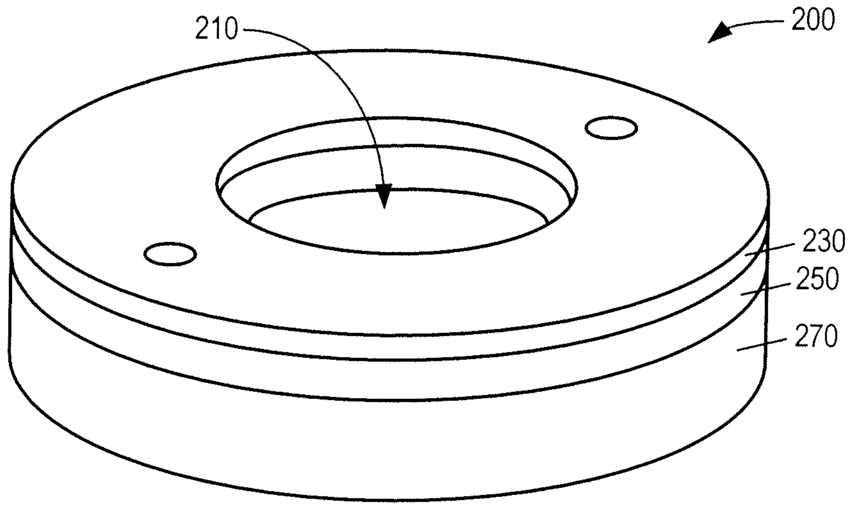
FIG. 9A is a perspective view of a multi-component powder compaction mold comprising an orthogonal top section, an angled middle section, and an orthogonal bottom section, wherein the mold cavity comprises a generally round peripheral shape.
Figure 9B:
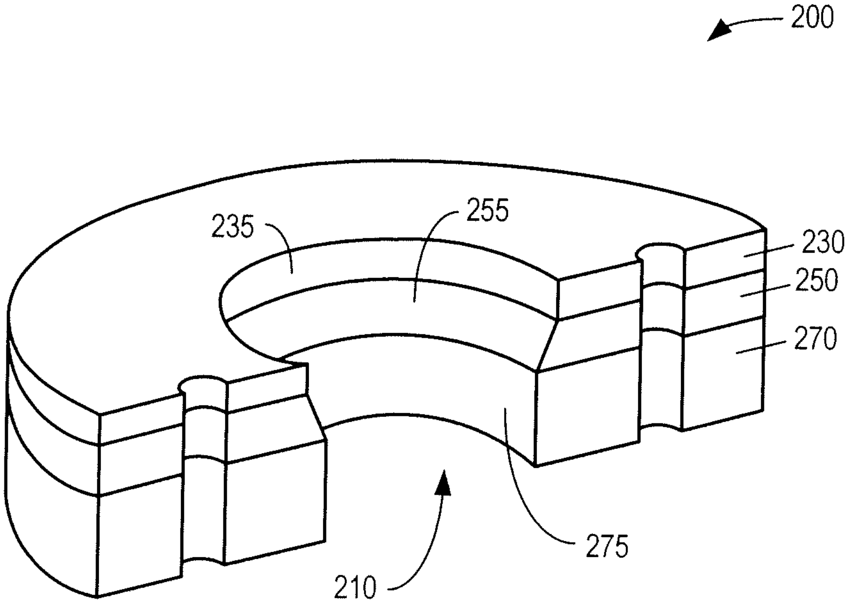
FIG. 9B is a cross-sectional perspective view of the multi-component powder compaction mold shown in FIG. 9A.

Multi-component powder compaction molds in accordance with various non-limiting embodiments may comprise mold cavities comprising peripheral shapes such as, for example, round, triangular, trigonal, square, rectangular, parallelogram, pentagonal, hexagonal, octagonal, and the like. For example, FIGS. 9A and 9B show a multi-component powder compaction mold 200 comprising a round-shaped mold cavity 210. The mold 200 comprises an orthogonal top section 230, an angled middle section 250, and an orthogonal bottom section 270. The orthogonal top section 230 comprises a round cavity formed by orthogonal cavity wall 235, the angled middle section 250 comprises a round cavity formed by angled cavity wall 255, and the orthogonal bottom section 270 comprises a round cavity formed by orthogonal cavity wall 275.

Figure 10A:
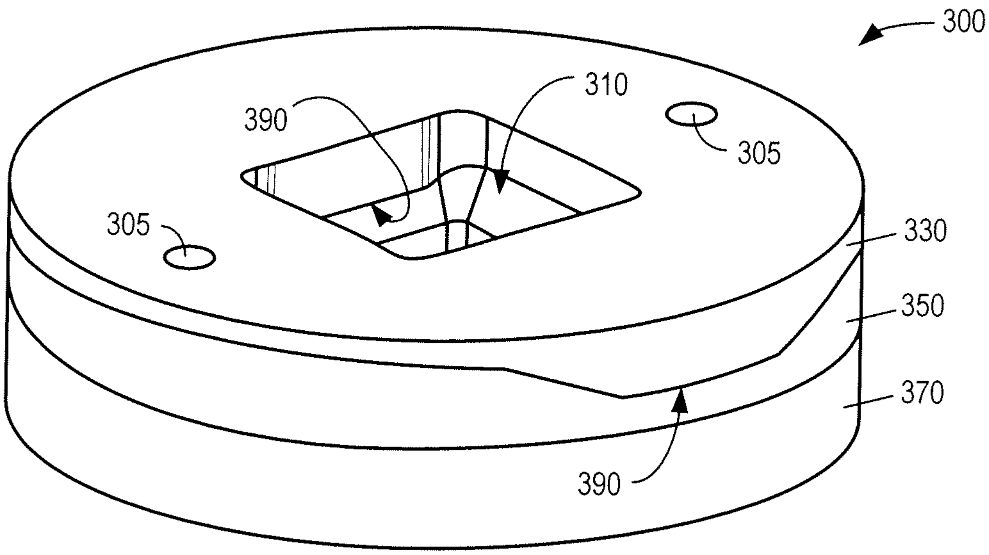
FIG. 10A is a perspective view of a multi-component powder compaction mold comprising an orthogonal top section, an angled middle section, and an orthogonal bottom section, wherein the mold cavity comprises a generally square peripheral shape, and wherein the top surface of the middle section and the bottom surface of the top section are mutually contoured.
Figure 10B:
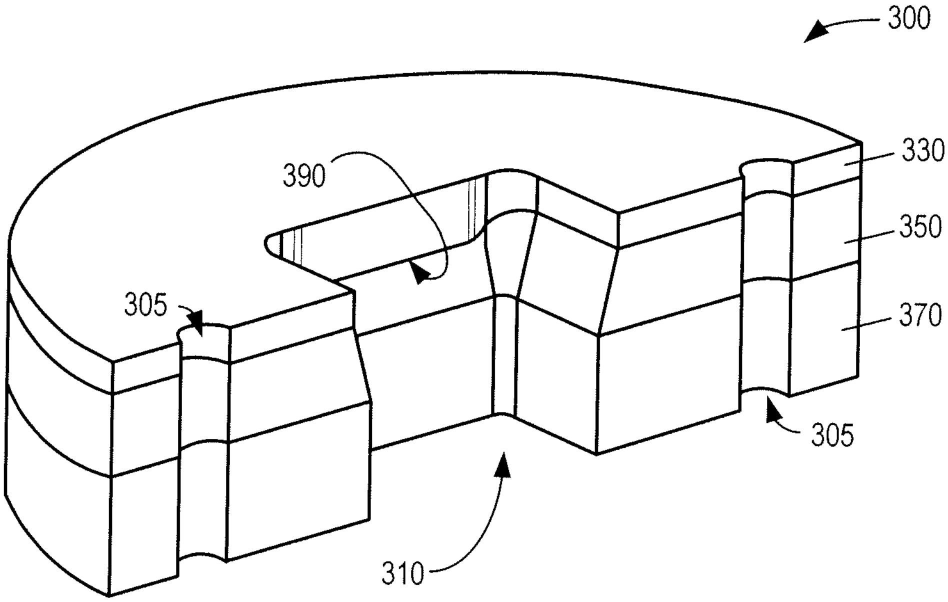
FIG. 10B is a cross-sectional perspective view of the multi-component powder compaction mold shown in FIG. 10A.

In various non-limiting embodiments, the mutually mating surfaces of the plurality of sections comprising a multi-component powder compaction mold may comprise mutually contoured surfaces and/or other mutually mating alignment features instead of, or in addition to, alignment holes. FIGS. 10A and 10B show a multi-component powder compaction mold 300 comprising an orthogonal top section 330, an angled middle section 350, and an orthogonal bottom section 370. The orthogonal top section 330 and the angled middle section 350 comprise mutually contoured bottom and top surfaces, respectively, as shown at 390. The mutually contoured bottom and top surfaces of the orthogonal top section 330 and the angled middle section 350, respectively, aid in the stacked alignment of the component sections to form mold cavity 310. While FIGS. 10A and 10B show the mutually contoured surfaces at 390 in addition to alignment holes 305, it is understood that mutually contoured surfaces and/or other mutually mating alignment features may be used instead of alignment holes in various non-limiting embodiments. In addition, while FIGS. 10A and 10B show the bottom and top surfaces of the orthogonal top section 330 and the angled middle section 350 as being mutually contoured surfaces, it is understood that the bottom surface of a middle section and the top surface of a bottom section may also be mutually contoured and/or comprise mutually mating alignment features.

Figure 11A:
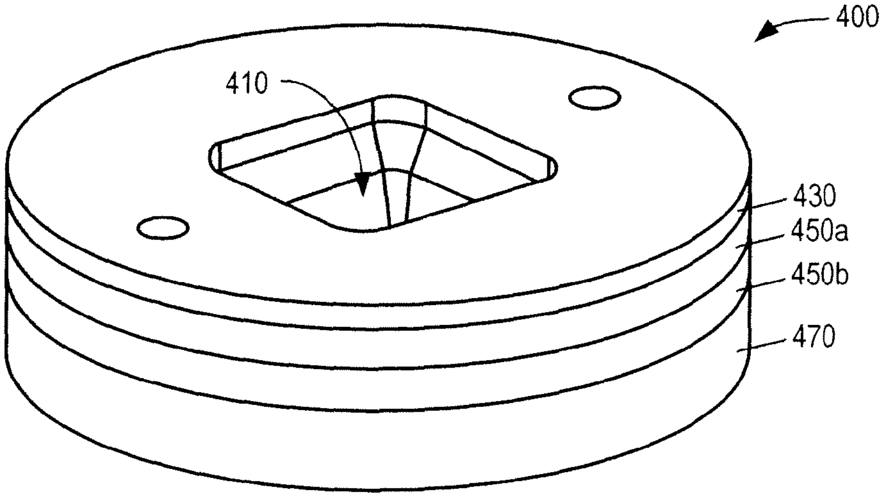
FIG. 11A is a perspective view of a multi-component powder compaction mold comprising an orthogonal top section, two angled middle sections, and an orthogonal bottom section, wherein the mold cavity comprises a generally square peripheral shape.
Figure 11B:
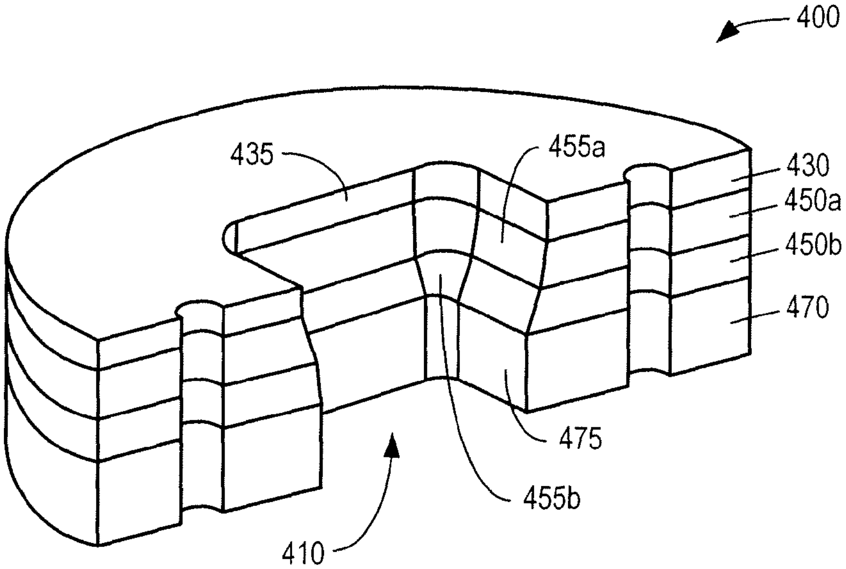
FIG. 11B is a cross-sectional perspective view of the multi-component powder compaction mold shown in FIG. 11A.
Figure 11C:
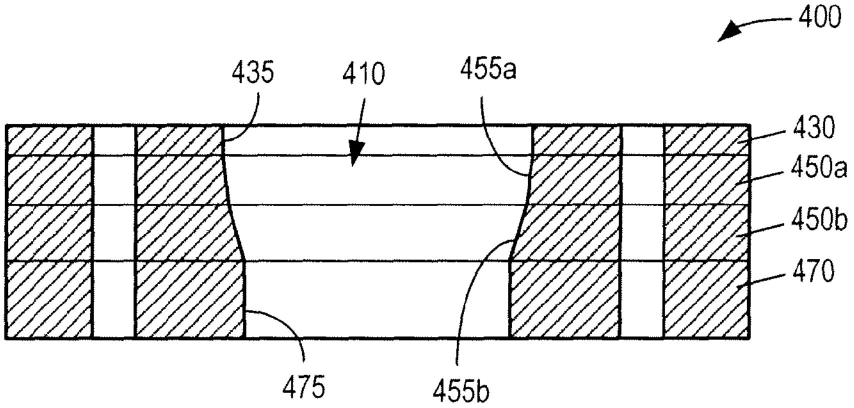
FIG. 11C is a side cross-sectional view of the multi-component powder compaction mold shown in FIGS. 11A and 11B.

In various non-limiting embodiments, a multi-component powder compaction mold may comprise a plurality of sections such as, for example, two, three, four, or more sections configured to assemble together in an aligned and stacked configuration and collectively form a mold cavity comprising sharp horizontal corner intersections and lacking the corner rounding, non-uniformities, and shape deviations inherent in monolithic powder compaction molds produced using die sinker EDM, for example. FIGS. 11A through 11C show a multi-component powder compaction mold comprising four aligned and stacked sections, and FIGS. 12A through 12C show a multi-component powder compaction mold comprising two aligned and stacked sections.

Referring to FIGS. 11A through 11C, a multi-component powder compaction mold 400 comprises an orthogonal top section 430, an upper angled middle section 450*a*, a lower angled middle section 450*b*, and an orthogonal bottom section 470. The orthogonal top section 430 comprises a generally square-shaped cavity formed by an orthogonal cavity wall 435, the upper angled middle section 450*a* comprises a generally square-shaped cavity formed by an upper angled cavity wall 455*a*, the lower angled middle section 450*b* comprises a generally square-shaped cavity formed by a lower angled cavity wall 455*b*, and the orthogonal bottom section 470 comprises a generally square-shaped cavity formed by orthogonal cavity wall 475. The multi-component powder compaction mold 400 comprises a mold cavity 410 formed by the respective cavities of the stacked and aligned sections 430, 450*a*, 450*b*, and 470. The respective angles of the upper angled cavity wall 455*a* and the lower angled cavity wall 455*b* are different angles.

Figure 12A:
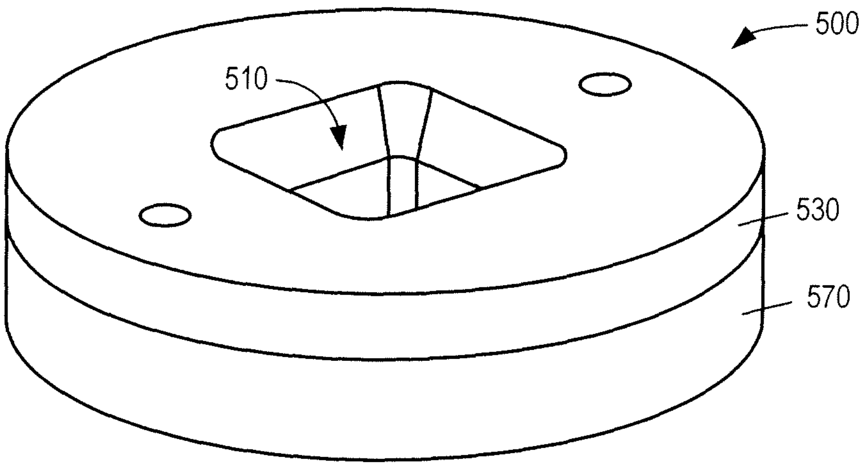
FIG. 12A is a perspective view of a multi-component powder compaction mold comprising an angled top section and an orthogonal bottom section, wherein the mold cavity comprises a generally square peripheral shape.
Figure 12B:
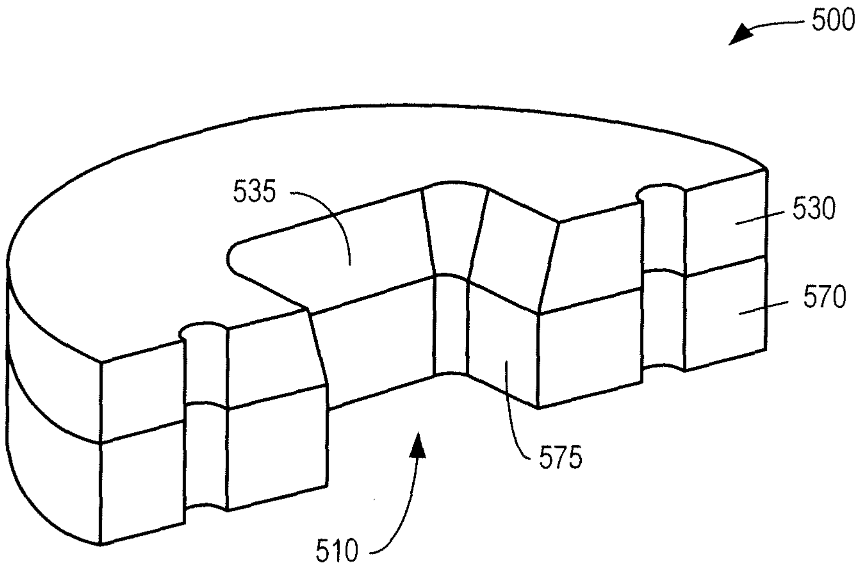
FIG. 12B is a cross-sectional perspective view of the multi-component powder compaction mold shown in FIG. 12A.
Figure 12C:
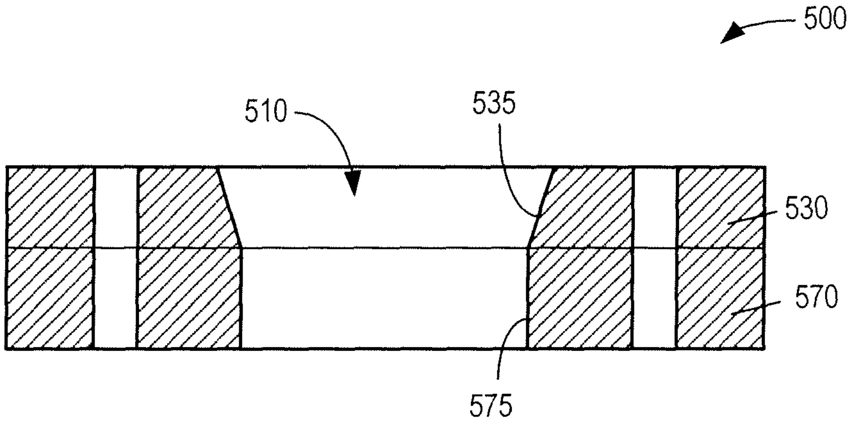
FIG. 12C is a side cross-sectional view of the multi-component powder compaction mold shown in FIGS. 12A and 12B.

Referring to FIGS. 12A through 12C, a multi-component powder compaction mold 500 comprises an angled top section 530 and an orthogonal bottom section 570. The angled top section 530 comprises a generally square-shaped cavity formed by an angled cavity wall 535, and the orthogonal bottom section 570 comprises a generally square-shaped cavity formed by orthogonal cavity wall 575. The multi-component powder compaction mold 500 comprises a mold cavity 510 formed by the respective cavities of the stacked and aligned sections 530 and 570. While not shown, it is understood that a multi-component powder compaction mold comprising two component sections may comprise an orthogonal top section and an angled bottom section.

Figure 13:
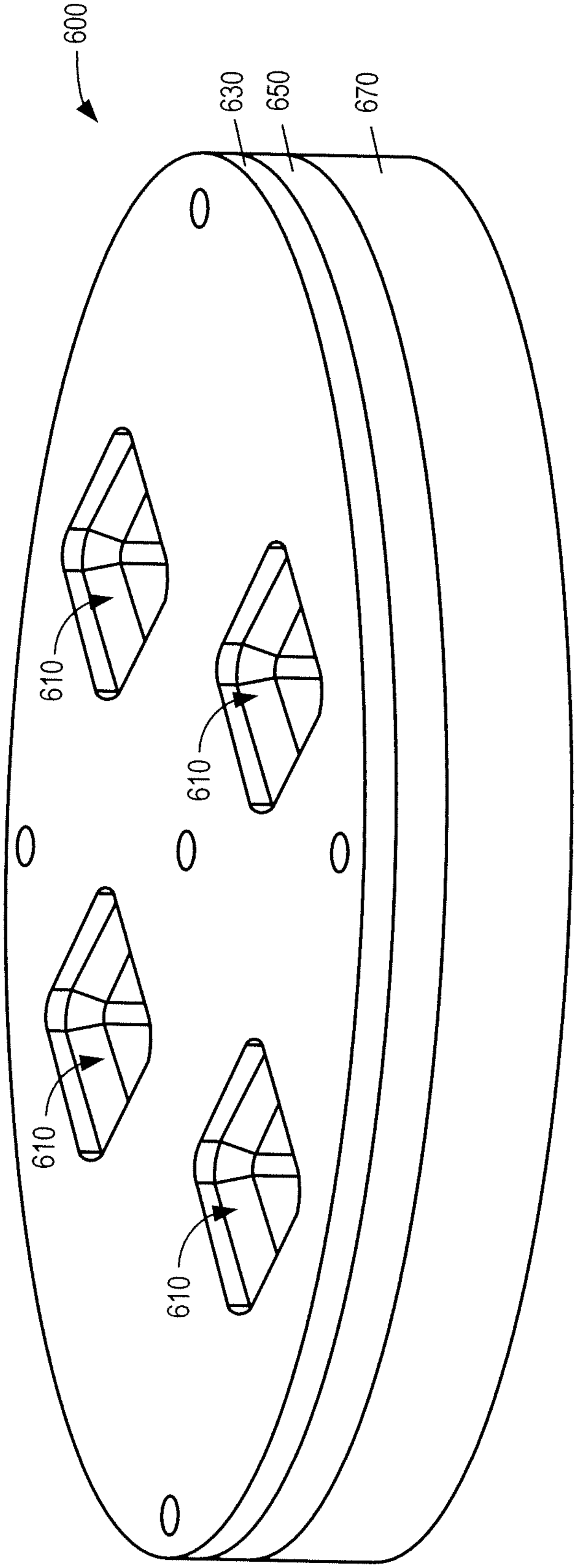
FIG. 13 is a perspective view of a multi-component powder compaction mold comprising an orthogonal top section, an angled middle section, and an orthogonal bottom section, wherein the mold comprises a plurality of mold cavities, and wherein the mold cavities comprise generally square peripheral shapes.

In various non-limiting embodiments, a multi-component powder compaction mold may comprise a plurality of mold cavities, such as, for example, two, three, four, or more cavities comprising sharp horizontal corner intersections and lacking the corner rounding, non-uniformities, and shape deviations inherent in monolithic powder compaction molds produced using die sinker EDM, for example. Referring to FIG. 13, a multi-component powder compaction mold 600 comprises an orthogonal top section 630, an angled middle section 650, and an orthogonal bottom section 670. Each of the orthogonal top section 630, the angled middle section 650, and the orthogonal bottom section 670 comprise a plurality of cavity walls that form four generally square-shaped cavities. In the stacked and aligned configuration shown in FIG. 13, the cavities of the respective sections form four mold cavities 610. Although four mold cavities are shown in FIG.

12, it is understood that a multi-component powder compaction mold may comprise any number of separate mold cavities.

In various non-limiting embodiments, a multi-component powder compaction mold for producing cutting inserts comprises a plurality of mold sections stacked and aligned to form a mold cavity. The mold cavity may comprise sharp horizontal corners formed by the intersection of two planar cavity walls, wherein each planar cavity wall corresponds to one of the plurality of mold sections. The planar cavity walls may have an orthogonal orientation or an angled orientation with respect to the top surface and/or the bottom surface of the respective mold section, and/or with respect to the top surface and/or the bottom surface of the assembled mold. The planar cavity walls may form cavities in the respective mold sections, which collectively form the mold cavity when the respective mold sections are stacked and aligned in an assembled configuration.

The respective mold sections may be produced by cutting the cavities into workpieces using a linear material cutting technique such as wire EDM, laser cutting, or water jet cutting, for example. The respective mold sections may comprise any suitable material for a powder compaction mold including, but not limited to, alloys such as tool steel and composites such as cemented carbides. For example, in various non-limiting embodiments, respective mold sections may comprise cobalt cemented tungsten carbide.

The respective mold sections may be joined together in a sequentially stacked, aligned, and assembled configuration using mechanical fasteners, metallurgical bonding, and/or adhesive bonding. For example, any two or more mold sections may be welded together, brazed together, adhesively bonded together, clamped together, or otherwise mechanically fastened together. Accurate and precise positioning of the respective sections may be accomplished using alignment pins, dowels, rods, or the like positioned through mutual alignment holes through the respective sections, which may lock the sections in mutual alignment. Alternatively, mechanical fasteners such as bolts, nuts, and the like may be positioned through mutual alignment holes through the respective sections. It is understood that both permanent joints such as welds, brazed joints, and adhesive joints (e.g., thermosetting epoxy), and temporary joining devices such as clamps and mechanical fasteners, may be used to join the respective mold sections together in an assembled configuration.

In various non-limiting embodiments, a process for the production of a cutting insert comprises pressing a metallurgical powder in a multi-component powder compaction mold to form a powder compact. The multi-component powder compaction mold may be assembled from a plurality of respective mold sections stacked and aligned to form a mold cavity. A metallurgical powder may be introduced into the mold cavity. Upper and lower pressing punches may press and compact the metallurgical powder in the mold cavity to form a powder compact. The powder compact may be sintered to densify the compact and form a cutting insert. Optionally, before sintering, the powder compact may be further shaped to produce desired geometric features such as chip breakers, grooves, facets, and the like on the rake faces, flank/clearance faces, and/or cutting edges of the cutting insert powder compact.

Figure 14A:
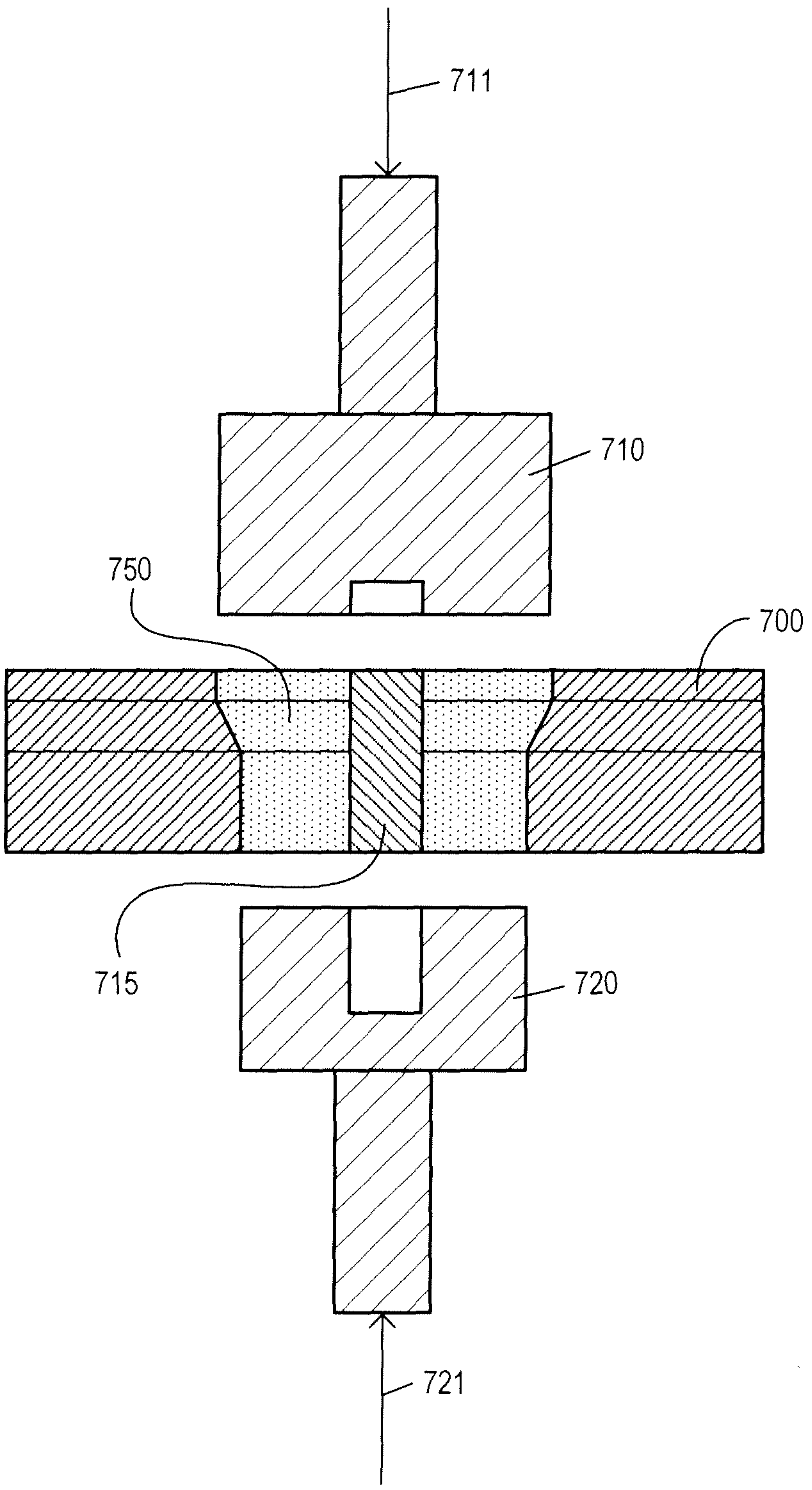
FIGS. 14A through 14C are schematic diagrams illustrating the production of a cutting insert powder compact using a multi-component powder compaction mold comprising an orthogonal top section, an angled middle section, and an orthogonal bottom section.
Figure 14B:
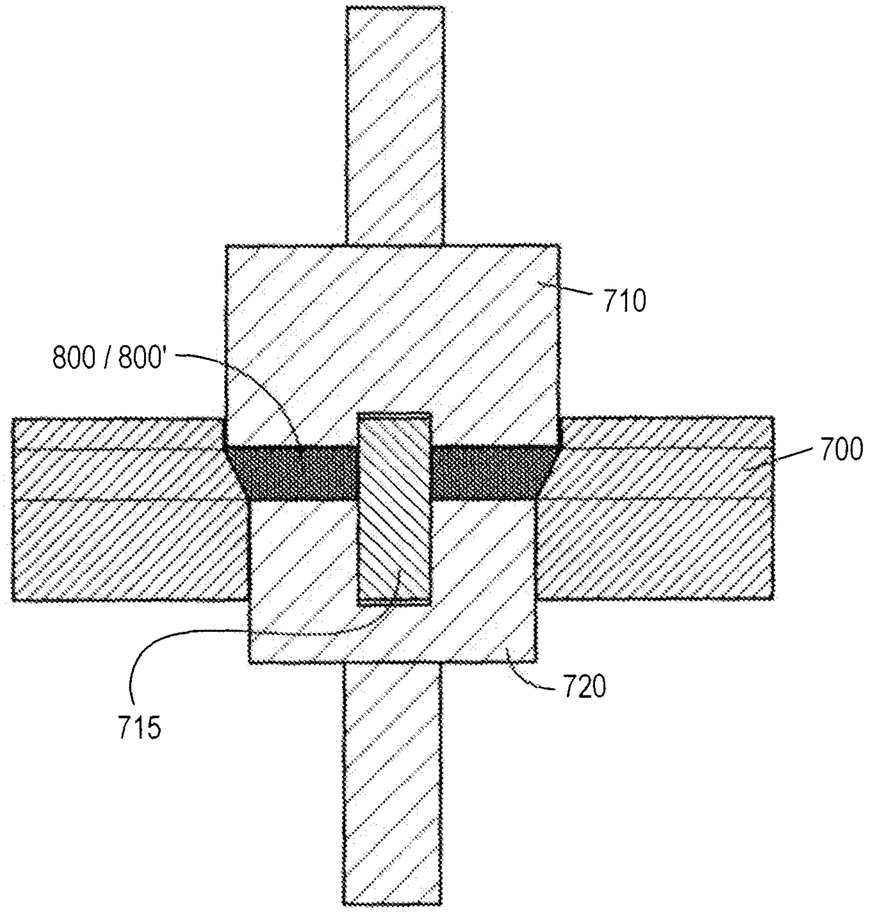
Figure 14C:
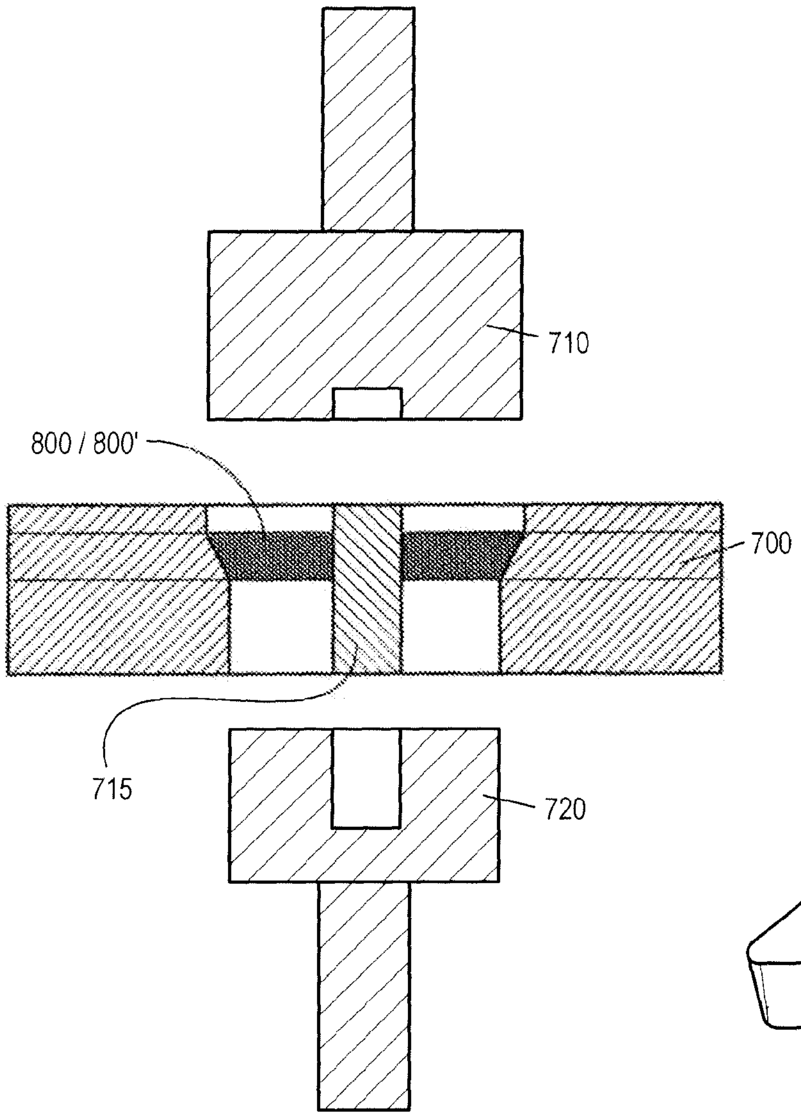

FIGS. 14A through 14C show the production of a cutting insert powder compact 800/800' using a multi-component powder compaction mold 700 comprising an orthogonal top section, an angled middle section, and an orthogonal bottom section (similar to the multi-component powder compaction mold 100 shown in FIGS. 6A through 6C, and the multi-component powder compaction mold 200 shown in FIGS. 9A and 9B).

A metallurgical powder 750 is introduced into the mold cavity of the multi-component powder compaction mold 700. A core rod assembly 715 is positioned in the mold cavity to provide a through-hole 810/810' in the cutting insert powder compact 800/800'. An upper pressing punch 710 and a lower pressing punch 720 move vertically as shown by arrows 711 and 721, respectively (FIG. 14A). The upper pressing punch 710 and the lower pressing punch 720 enter the multi-component powder compaction mold 700 and compress the metallurgical powder in the mold cavity to form a powder compact 800/800' (FIG. 14B). The entry of the upper pressing punch 710 and the lower pressing punch 720 into the multi-component powder compaction mold 700 is facilitated by the orthogonal cavity walls of the orthogonal top section and the orthogonal bottom section of the mold 700.

Figure 15A:
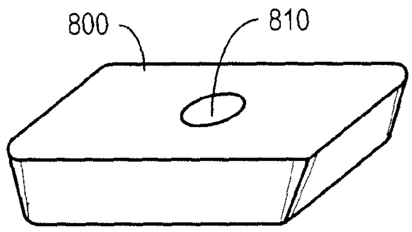
FIG. 15A is a perspective view of a generally square-shaped cutting insert powder compact produced according to the production process illustrated in FIGS. 14A through 14C.
Figure 15B:
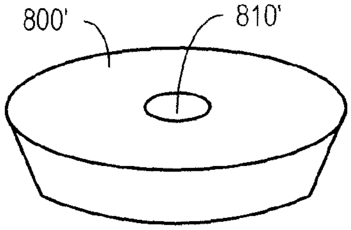
FIG. 15B is a perspective view of a generally round-shaped cutting insert powder compact produced according to the production process illustrated in FIGS. 14A through 14C.

FIG. 14C shows the cutting insert powder compact 800/800' in the mold cavity after the pressing punches 710 and 720 are withdrawn from the mold cavity. The cutting insert powder compacts 800 and 800' are shown removed from the mold 700 in FIGS. 15A and 15B, respectively. The cutting insert powder compacts 800 and 800' have the shape and geometry of the mold cavity and include through-holes 810 and 810' for attaching the resultant cutting insert to a cutting tool holder. The pressed compacts 800 and 800' may be sintered to densify the material and produce the cutting inserts.

Figure 16:
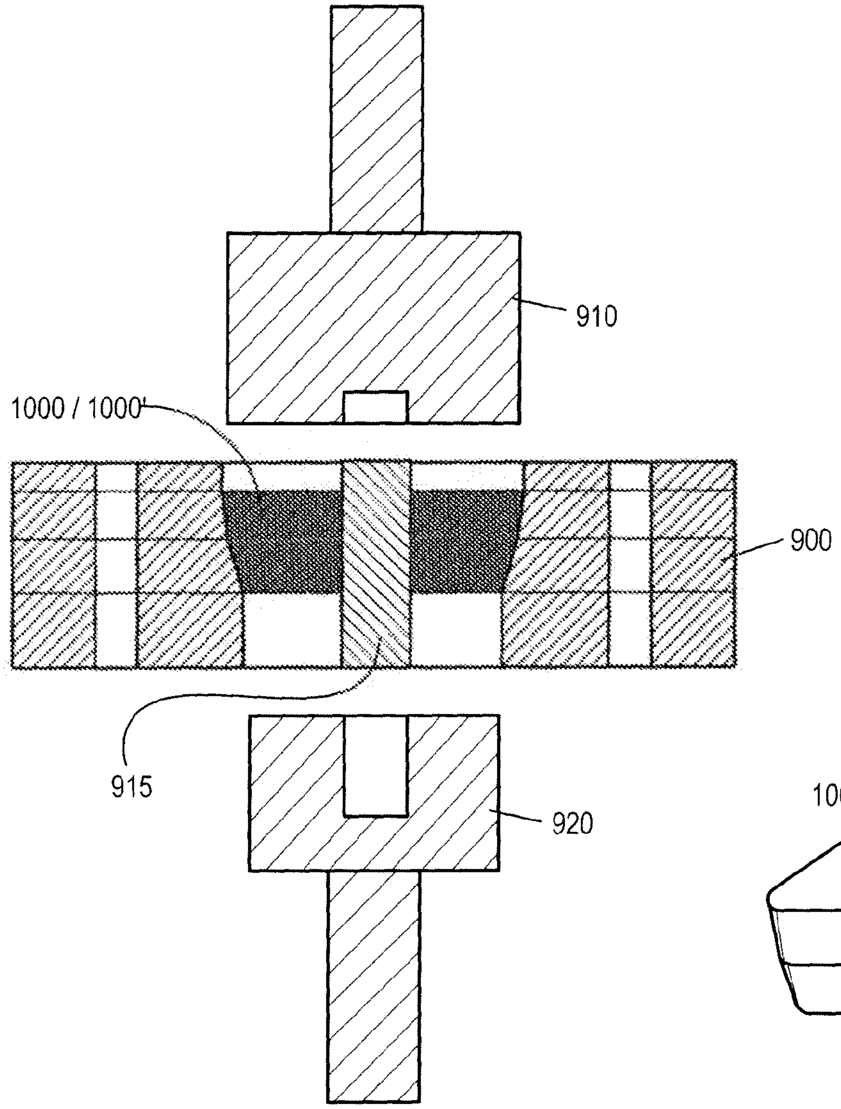
FIG. 16 is a schematic diagram illustrating the production of a cutting insert powder compact using a multi-component powder compaction mold comprising an orthogonal top section, two angled middle sections, and an orthogonal bottom section.

The cutting insert powder compact pressing process shown in FIGS. 14A through 14C may be modified to utilize any multi-component powder compaction mold in accordance with the various non-limiting embodiments described in this specification. For example, FIG. 16 shows the production of a cutting insert powder compact 1000/1000' using a multi-component powder compaction mold 900 comprising an orthogonal top section, two angled middle sections, and an orthogonal bottom section (similar to the multi-component powder compaction mold 400 shown in FIGS. 11A through 11C).

A metallurgical powder is introduced into the mold cavity of the multi-component powder compaction mold 900. A core rod assembly 915 is positioned in the mold cavity to provide a through-hole 1100/1100' in the cutting insert powder compact 1000/1000'. An upper pressing punch 910 and a lower pressing punch 920 enter the multi-component powder compaction mold 900 and compress the metallurgical powder in the mold cavity to form a powder compact. The entry of the upper pressing punch 910 and the lower pressing punch 920 into the multi-component powder compaction mold 900 is facilitated by the orthogonal cavity walls of the orthogonal top section and an orthogonal bottom section of the mold 900.

Figure 17A:
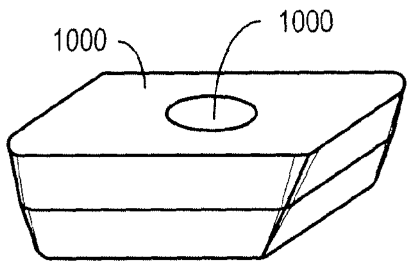
FIG. 17A is a perspective view of a generally square-shaped cutting insert powder compact produced according to the production process illustrated in FIG. 16.
Figure 17B:
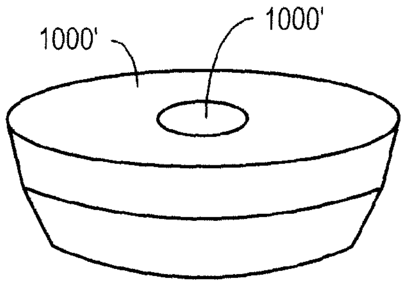
FIG. 17B is a perspective view of a generally round-shaped cutting insert powder compact produced according to the production process illustrated in FIG. 16.

The cutting insert powder compacts 1000 and 1000' are shown removed from the mold 900 in FIGS. 17A and 17B, respectively. The cutting insert powder compacts 1000 and 1000' have the shape and geometry of the mold cavity and include through-hole 1100/1100' for attaching the resultant cutting insert to a cutting tool holder. The pressed compacts 1000 and 1000' may be sintered to densify the material and produce the cutting inserts. While not shown in FIGS. 14A through 17B, the geometry of the top and bottom surfaces of the cutting insert powder compacts produced in the multi-component powder compaction mold is provided by the geometry of the pressing surfaces of the upper punch and the lower punch, respectively.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. In this manner, Applicant reserves the right to amend the claims during prosecution to add features as variously described in this specification, and such amendments comply with the requirements of 35 U.S.C. §112, first paragraph, and 35 U.S.C. §132(a).

What is claimed is:

1. A multi-component powder compaction mold for the production of cutting inserts comprising:

a single piece orthogonal top section comprising an orthogonal cavity wall forming a top cavity in and extending entirely through the orthogonal top section;

at least one angled middle section comprising an angled cavity wall forming at least one middle cavity in and extending entirely through the angled middle section, wherein each middle section is a single piece; and a single piece orthogonal bottom section comprising an orthogonal cavity wall forming a bottom cavity in and extending through the orthogonal bottom section;

wherein the orthogonal top section, the at least one angled middle section, and the orthogonal bottom section are stacked against one another, rigidly secured to one another and aligned so that the top cavity, the at least one middle cavity, and the bottom cavity collectively form a mold cavity comprising an orthogonal top cavity wall, at least one angled middle cavity wall, and an orthogonal bottom cavity wall, the intersecting cavity walls forming horizontal corner intersections in the mold cavity.

2. The multi-component powder compaction mold of claim 1, wherein the mold comprises one angled middle section and the mold cavity comprises one angled middle cavity wall forming horizontal corner intersections with the orthogonal top cavity wall and the orthogonal bottom cavity wall.

3. The multi-component powder compaction mold of claim 1, wherein the mold comprises an upper angled middle section and a lower angled middle section, and the mold cavity comprises an upper angled middle cavity wall and a lower angled middle cavity wall.

4. The multi-component powder compaction mold of claim 3, wherein the upper angled middle cavity wall forms a horizontal corner intersection with the orthogonal top cavity wall, and wherein the lower angled middle cavity wall forms a horizontal corner intersection with the orthogonal bottom cavity wall.

5. The multi-component powder compaction mold of claim 1, wherein the mold cavity comprises a peripheral shape selected from the group consisting of round, triangular, trigonal, square, rectangular, parallelogram, pentagonal, hexagonal, and octagonal.

6. The multi-component powder compaction mold of claim 1, wherein the mold cavity comprises a generally square peripheral shape.

7. The multi-component powder compaction mold of claim 1, wherein the mold cavity comprises a generally round peripheral shape.

8. The multi-component powder compaction mold of claim 1, wherein at least two of the orthogonal top section, the at least one angled middle section, and the orthogonal bottom section comprise mutually contoured surfaces.

9. The multi-component powder compaction mold of claim 1, wherein the orthogonal top section, the at least one angled middle section, and the orthogonal bottom section comprise alignment holes configured to receive an alignment pin to lock the sections in mutual alignment.

10. The multi-component powder compaction mold of claim 1, wherein the orthogonal top section, the at least one angled middle section, and the orthogonal bottom section are stacked, aligned, and permanently joined together.

11. The multi-component powder compaction mold of claim 10, wherein the orthogonal top section, the at least one angled middle section, and the orthogonal bottom section are adhesively bonded together.

12. The multi-component powder compaction mold of claim 10, wherein the orthogonal top section, the at least one angled middle section, and the orthogonal bottom section are metallurgically bonded together.

13. The multi-component powder compaction mold of claim 1, wherein the orthogonal top section, the at least one angled middle section, and the orthogonal bottom section are mechanically fastened together.

14. The multi-component powder compaction mold of claim 1, wherein the orthogonal top section, the at least one angled middle section, and the orthogonal bottom section are formed of a material comprising an alloy.

15. The multi-component powder compaction mold of claim 1, wherein the orthogonal top section, the at least one angled middle section, and the orthogonal bottom section are formed of a material comprising a cemented carbide.

16. A multi-component powder compaction mold for the production of cutting inserts comprising:

a single piece top section comprising a cavity wall forming a top cavity in the top section; and a single piece bottom section comprising a cavity wall forming a bottom cavity in the bottom section; wherein the top section and the bottom section are stacked and aligned so that the top cavity and the bottom cavity collectively form a mold cavity comprising a top cavity wall and a bottom cavity wall; and a single piece upper angled middle section and a single piece lower angled middle section stacked and aligned between the bottom section and the top section, wherein the mold cavity comprises an upper angled middle cavity wall and a lower angled middle cavity wall, wherein the upper angled middle cavity wall forms a horizontal corner intersection with the top cavity wall, and wherein the lower angled middle cavity wall forms a horizontal corner intersection with the bottom cavity wall;

wherein the top cavity wall and the bottom cavity wall are orthogonal cavity walls.

17. The multi-component powder compaction mold of claim 16, wherein the mold cavity comprises a peripheral shape selected from the group consisting of round, triangular, trigonal, square, rectangular, parallelogram, pentagonal, hexagonal, and octagonal.

18. The multi-component powder compaction mold of claim 16, wherein the top section and the bottom section comprise alignment holes configured to receive an alignment pin to lock the sections in mutual alignment.

19. The multi-component powder compaction mold of claim 16, wherein the top section and the bottom section are formed of a material comprising an alloy.

20. The multi-component powder compaction mold of claim 16, wherein the top section and the bottom section are formed of a material comprising a cemented carbide.

* * * * *